(12) United States Patent
Sasaki

(10) Patent No.: US 9,969,451 B2
(45) Date of Patent: May 15, 2018

(54) BICYCLE PEDAL

(71) Applicant: Shimano Inc., Sakai, Osaka (JP)

(72) Inventor: Bungo Sasaki, Osaka (JP)

(73) Assignee: Shimano Inc., Osaka (JP)

( * ) Notice: Subject to any disclaimer, the term of this patent is extended or adjusted under 35 U.S.C. 154(b) by 298 days.

(21) Appl. No.: 14/466,127

(22) Filed: Aug. 22, 2014

(65) Prior Publication Data
US 2016/0052584 A1    Feb. 25, 2016

(51) Int. Cl.
| | | |
|---|---|---|
| *B62M 1/36* | (2013.01) | |
| *G01L 5/13* | (2006.01) | |
| *B62M 6/50* | (2010.01) | |
| *G01L 3/24* | (2006.01) | |
| *B62J 99/00* | (2009.01) | |

(52) U.S. Cl.
CPC ........... *B62J 99/00* (2013.01); *B62M 1/36* (2013.01); *B62M 6/50* (2013.01); *G01L 3/24* (2013.01); *G01L 5/13* (2013.01); *B62J 2099/002* (2013.01)

(58) Field of Classification Search
CPC . B62M 6/50; B62M 6/45; B62M 1/36; B62M 3/08; B62M 3/16; B62M 3/00; G01L 5/13; G01L 3/247; G01L 3/242; G01L 1/2243; G01L 1/22; G01L 1/2206; G01L 1/2212; G01L 1/2218; G01L 1/2225; G01L 1/2231; G01L 1/2237; B62J 2099/002; B62J 2099/0013; G05G 1/30; B62K 2207/00
See application file for complete search history.

(56) References Cited

U.S. PATENT DOCUMENTS

| | | | | |
|---|---|---|---|---|
| 3,771,359 A | * | 11/1973 | Shoberg .................. | G01L 5/161 73/862.044 |
| 4,411,169 A | * | 10/1983 | Takeda ..................... | B62M 3/08 411/501 |
| 4,463,433 A | * | 7/1984 | Hull ........................ | A61B 5/221 702/41 |
| 4,911,024 A | * | 3/1990 | McMaster ............... | G01L 5/161 73/862.044 |

(Continued)

FOREIGN PATENT DOCUMENTS

| | | |
|---|---|---|
| DE | 44 35 174 A1 | 3/1996 |
| DE | 101 58 600 A1 | 6/2003 |

(Continued)

*Primary Examiner* — Daniel D Yabut
(74) *Attorney, Agent, or Firm* — Global IP Counselors, LLP

(57) ABSTRACT

A bicycle pedal is basically provided with a pedal spindle, a pedal body, a sensor adaptor and at least one force sensor. The pedal spindle includes a crank arm mounting part. The pedal body is rotatably mounted on the pedal spindle about a center spindle axis. The sensor adaptor includes a first fixing part non-movably attached to the pedal spindle at a first point, a second fixing part non-movably attached to the pedal spindle at a second point and a sensor mounting part extending between the first and second fixing parts, the first point being axially spaced from the second point with respect to the center spindle axis, the sensor mounting part being non-fixed to the pedal spindle. The force sensor is disposed on the sensor mounting part to detect a pedaling force transmitted from the pedal body to the pedal spindle.

23 Claims, 11 Drawing Sheets

(56) References Cited

U.S. PATENT DOCUMENTS

| | | | |
|---|---|---|---|
| 6,983,672 B2 * | 1/2006 | Smith | B62M 3/003 384/537 |
| 8,011,242 B2 | 9/2011 | O'Neill et al. | |
| 8,327,723 B2 | 12/2012 | Roudergues et al. | |
| 8,584,529 B2 * | 11/2013 | Fisher | B62M 3/00 73/760 |
| 8,943,902 B2 * | 2/2015 | Bosscher | G01L 5/226 73/862.041 |
| 2002/0107085 A1 * | 8/2002 | Lee | A63B 24/0003 473/221 |
| 2010/0024590 A1 * | 2/2010 | O'Neill | G01L 3/242 74/594.1 |
| 2011/0041626 A1 * | 2/2011 | Tuulari | G01L 1/2237 73/862.627 |
| 2011/0067503 A1 * | 3/2011 | Roudergues | G01L 5/161 73/862.51 |
| 2012/0166105 A1 * | 6/2012 | Biermann | A63B 24/0062 702/43 |
| 2012/0173167 A1 * | 7/2012 | Lukatela | G01L 3/108 702/42 |
| 2012/0210784 A1 | 8/2012 | Kokkoneva et al. | |
| 2012/0238410 A1 * | 9/2012 | Magakat | B62M 3/00 482/57 |
| 2013/0197744 A1 | 8/2013 | Tuulari et al. | |
| 2013/0205916 A1 * | 8/2013 | Kodama | A63B 24/0062 73/862.69 |
| 2013/0333489 A1 * | 12/2013 | David | G01L 1/044 73/862.641 |
| 2015/0247767 A1 * | 9/2015 | Tetsuka | G01L 1/22 73/862.631 |

FOREIGN PATENT DOCUMENTS

| | | |
|---|---|---|
| WO | 2009/083787 A1 | 7/2009 |
| WO | 2010/014964 A2 | 2/2010 |

* cited by examiner

BICYCLE PEDAL

BACKGROUND

Field of the Invention

This invention generally relates to a bicycle pedal. More specifically, the present invention relates to a bicycle pedal that detects a cyclist's pedaling force.

Background Information

Bicycles are sometimes equipped with various sensors for providing information to the rider about various aspects of the bicycle. One such sensor is a torque or force sensor for detecting a pedaling force of the rider. Various sensing arrangements have been proposed for detecting a pedaling force of the rider. For example, pedaling force measurement devices are in disclosed in U.S. Pat. No. 7,516,677, U.S. Pat. No. 8,011,242 and U.S. Pat. No. 8,327,723.

SUMMARY

Generally, the present disclosure is directed to various features of a bicycle pedal. In one feature, a bicycle pedal is provided that detects a cyclist's pedaling force. It has been discovered that when a shear force exerted on a pedal spindle is detected by a sensor, an output signal of the sensor changes based on a where a center position of the rider's pedaling force is applied to the pedal spindle with respect to an axial direction of the pedal spindle.

In view of the state of the known technology and in accordance with a first aspect of the present disclosure, a bicycle pedal is provided that basically comprises a pedal spindle, a pedal body, a sensor adaptor, and at least one force sensor. The pedal spindle includes a crank arm mounting part. The pedal body is rotatably mounted on the pedal spindle about a center spindle axis. The sensor adaptor includes a first fixing part non-movably attached to the pedal spindle at a first point, a second fixing part non-movably attached to the pedal spindle at a second point and a sensor mounting part extending between the first and second fixing parts. The first point is axially spaced from the second point with respect to the center spindle axis. The sensor mounting part is non-fixed to the pedal spindle. The force sensor is disposed on the sensor mounting part to detect a pedaling force transmitted from the pedal body to the pedal spindle.

In accordance with a second aspect of the present invention, the bicycle pedal according to the first aspect is configured so that the first and second fixing parts are press-fitted on the pedal spindle.

In accordance with a third aspect of the present invention, the bicycle pedal according to the first aspect is configured so that first and second fixing parts are bonded to the pedal spindle.

In accordance with a fourth aspect of the present invention, the bicycle pedal according to the first aspect is configured so that the sensor mounting part is connected to the first fixing part by a plurality of first connections that are circumferentially spaced apart and separated by openings. The sensor mounting part is connected to the second fixing part by a plurality of second connections that are circumferentially spaced apart and separated by openings.

In accordance with a fifth aspect of the present invention, the bicycle pedal according to the first aspect is configured so that the sensor mounting part includes a plurality of mounting portions that are circumferentially spaced apart and separated by openings. The at least one force sensor is disposed on at least one of the mounting portions.

In accordance with a sixth aspect of the present invention, the bicycle pedal according to the fifth aspect is configured so that the plurality of mounting portions includes four of the mounting portions that are disposed ninety degrees apart with respect to the center spindle axis.

In accordance with a seventh aspect of the present invention, the bicycle pedal according to the first aspect is configured so that the sensor mounting part is concentrically disposed around the pedal spindle with an annular gap between the sensor mounting part and an outer peripheral surface of the pedal spindle.

In accordance with an eighth aspect of the present invention, the bicycle pedal according to the first aspect is configured so that the first fixing part includes a first flange extending radially outward with respect to the center spindle axis to a free end that is spaced further from the center spindle axis than the at least one force sensor. The second fixing part includes a second flange extending radially outward with respect to the center spindle axis to a free end that is spaced further from the center spindle axis than the at least one force sensor.

In accordance with a ninth aspect of the present invention, the bicycle pedal according to the first aspect is configured so that the at least one force sensor includes a first shear force sensor, a second shear force sensor, a first bending force sensor, and a second bending force sensor. The first shear force sensor is mounted on the sensor mounting part to detect a first shear component of the pedaling force with respect to the center spindle axis. The second shear force sensor is mounted on the sensor mounting part to detect a second shear component of the pedaling force with respect to the center spindle axis. The first bending force sensor is mounted on the sensor mounting part to detect a first bending component of the pedaling force with respect to the center spindle axis. The second bending force sensor is mounted on the sensor mounting part to detect a second bending component of the pedaling force with respect to the center spindle axis.

In accordance with a tenth aspect of the present invention, the bicycle pedal according to the ninth aspect is configured so that the first shear force sensor is circumferentially spaced from the second shear force sensor on the sensor mounting part with respect to the center spindle axis. The first bending force sensor is circumferentially spaced from the second bending force sensor on the sensor mounting part with respect to the center spindle axis.

In accordance with an eleventh aspect of the present invention, the bicycle pedal according to the tenth aspect is configured so that the pedal spindle further includes a pedal body support part and a sensor support part. The pedal body support part rotatably supports the pedal body. The sensor support part supports the sensor adaptor including the first and second shear force sensors and the first and second bending force sensors. The sensor support part is axially disposed between the crank arm mounting part and the pedal body support part.

In accordance with a twelfth aspect of the present invention, the bicycle pedal according to the eleventh aspect is configured so that the pedal spindle further includes a first bore that extends axially at least through the crank arm mounting part, and at least one second bore extending from the outer peripheral surface of the pedal spindle to the first bore. Each of the first and second shear force sensors and the first and second bending force sensors has a communication line that extends through the at least one second bore and the first bore.

In accordance with a thirteenth aspect of the present invention, the bicycle pedal according to the twelfth aspect is configured so that the at least one second bore includes a plurality of second bores.

In accordance with a fourteenth aspect of the present invention, the bicycle pedal according to the tenth aspect is configured so that the first and second shear force sensors are selected from the group consisting of resistance strain gauges and semiconductor strain gauges. The first and second bending force sensors are selected from the group consisting of resistance strain gauges and semiconductor strain gauges.

In accordance with a fifteenth aspect of the present invention, the bicycle pedal according to the fourteenth aspect is configured so that the first and second shear force sensors are disposed ninety degrees apart with respect to the center spindle axis. The first and second bending force sensors are disposed ninety degrees apart with respect to the center spindle axis.

In accordance with a sixteenth aspect of the present invention, the bicycle pedal according to the fifteenth aspect is configured so that the first and second shear force sensors are angularly offset from the first and second bending force sensors with respect to the center spindle axis.

In accordance with a seventeenth aspect of the present invention, the bicycle pedal according to the sixteenth aspect is configured so that the first shear force sensor is disposed opposite to the first bending force sensor with respect to the center spindle axis. The second shear force sensor is disposed opposite to the second bending force sensor with respect to the center spindle axis.

In accordance with an eighteenth aspect of the present invention, the bicycle pedal according to the fifteenth aspect is configured so that the first shear force sensor is angularly aligned with the first bending force sensor with respect to the center spindle axis. The second shear force sensor is angularly aligned with the second bending force sensor with respect to the center spindle axis.

In accordance with a nineteenth aspect of the present invention, the bicycle pedal according to the first aspect is configured so that the bicycle pedal further comprises a controller configured to be detachably fixed to the crank arm and in communication with the first and second shear force sensors and the first and second bending force sensors.

In accordance with a twentieth aspect of the present invention, the bicycle pedal according to the nineteenth aspect is configured so that the controller is programmed to calculate a pedaling power during a pedal cycle based on data received from the first and second shear force sensors and the first and second bending force sensors.

In accordance with a twenty-first aspect of the present invention, the bicycle pedal according to the nineteenth aspect further comprises a cadence sensor in communication with the controller.

In accordance with a twenty-second aspect of the present invention, the bicycle pedal according to the first aspect further comprises a wireless transmitter electrically connected to the first and second shear force sensors and the first and second bending force sensors.

In accordance with a twenty-third aspect of the present invention, a bicycle pedal spindle is provided that basically comprises a crank arm mounting part, a pedal body support part, a sensor adaptor, and at least one force sensor. The pedal body support part is configured to rotatably support a pedal body about a center spindle axis. The sensor adaptor includes a first fixing part non-movably attached to the pedal spindle at a first point, a second fixing part non-movably attached to the pedal spindle at a second point and a sensor mounting part extending between the first and second fixing parts. The first point is axially spaced from the second point with respect to the center spindle axis, the sensor mounting part being non-fixed to the pedal spindle. The force sensor is disposed on the sensor mounting part to detect a pedaling force transmitted from the pedal body to the pedal spindle.

Also other objects, features, aspects and advantages of the disclosed bicycle pedal will become apparent to those skilled in the bicycle field from the following detailed description, which, taken in conjunction with the annexed drawings, discloses several illustrative embodiments of the bicycle pedal.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
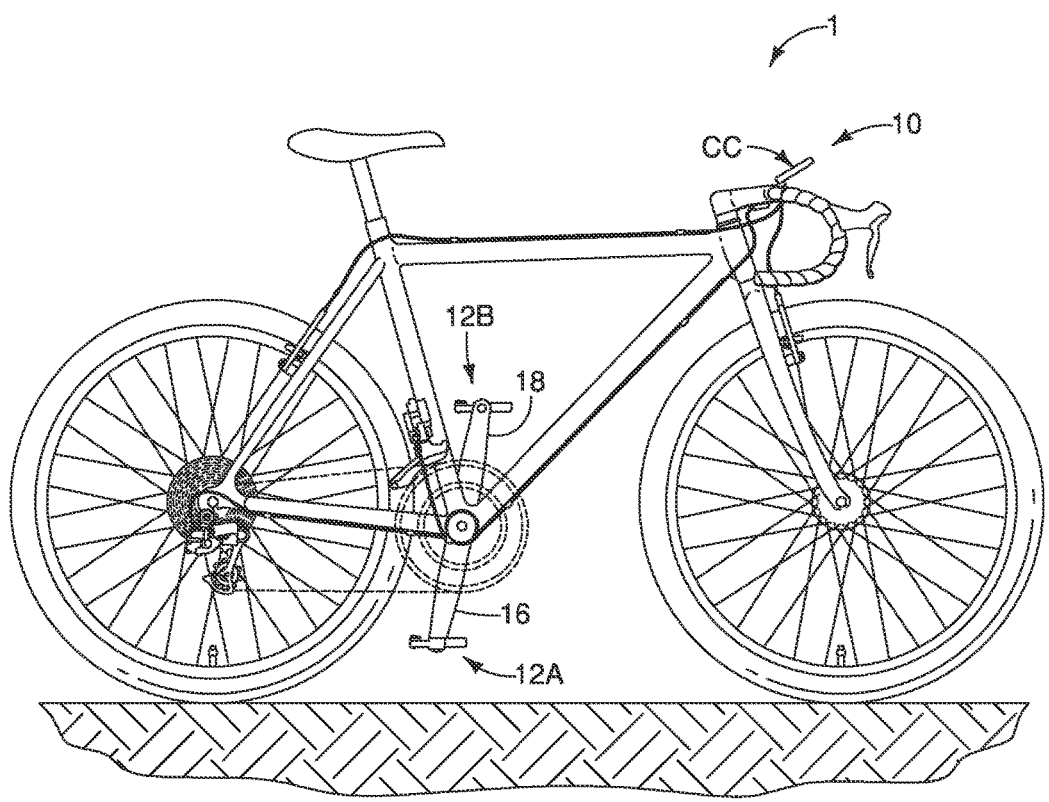
FIG. 1 is a side elevational view of a bicycle that is equipped with a pedaling state detecting apparatus having a pair of bicycle pedals in accordance with one illustrated embodiment.

Referring initially to FIG. 1, a bicycle 1 is illustrated that is equipped with a pedaling state detecting apparatus 10 having a pair of bicycle pedals 12A and 12B in accordance with a first embodiment. While the bicycle 1 illustrated is a road bike, the bicycle pedals 12A and 12B can be used with other types of bicycles as needed and/or desired. In particular, the bicycle pedals 12A and 12B can be installed on both moving bicycles that advance when a rider pedals and stationary bicycles, such as exercise bicycles. The bicycle 1 and its various parts are conventional, except for components of the pedaling state detecting apparatus (i.e., the bicycle pedals 12A and 12B) as discussed herein. Thus, the bicycle 1 and its various parts will not be discussed and/or illustrated in detail herein, except as needed to understand the bicycle pedals 12A and 12B.

The bicycle pedals 12A and 12B are clipless or step-in pedals. In other words, the bicycle pedals 12A and 12B are clipless or step-in pedal that is used with a bicycle shoe (not shown) having a cleat fixedly coupled to the sole of a shoe. Alternatively, the bicycle pedals 12A and 12B can be configured without any cleat engagement structure.

Figure 2:
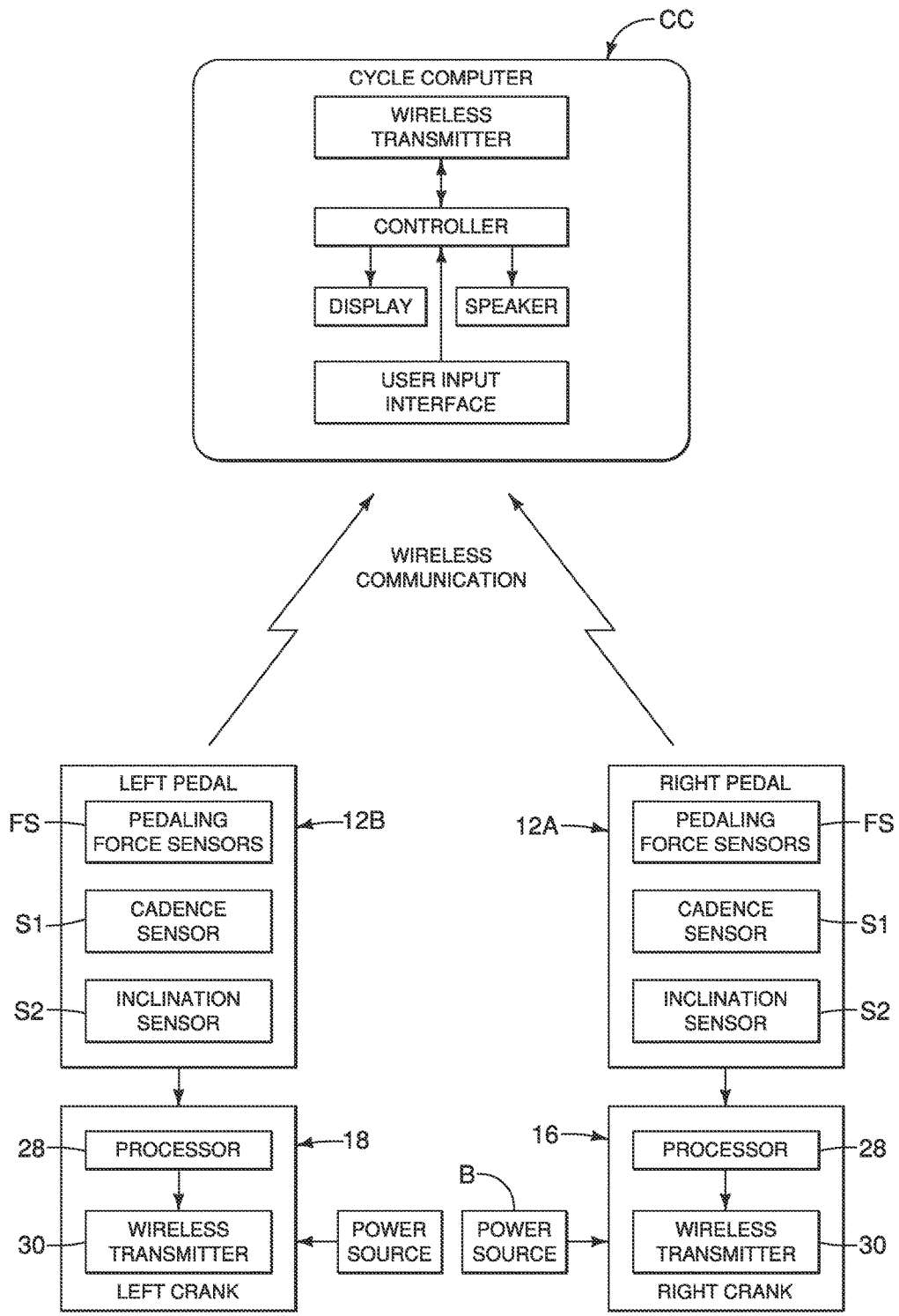
FIG. 2 is a schematic block diagram showing an overall configuration of the pedaling state detecting apparatus illustrated in FIG. 1.

Referring now to FIG. 2, the pedaling state detecting apparatus 10 is schematically illustrated. The pedaling state detecting apparatus 10 uses the bicycle pedals 12A and 12B to notify a rider of the pedaling state of the bicycle 1. Basically, in addition to the bicycle pedals 12A and 12B, the pedaling state detecting apparatus 10 includes a cycle computer CC that wirelessly communicates with the bicycle pedals 12A and 12B for notifying a rider of the pedaling state of the bicycle 1. In particular, the cycle computer CC of the pedaling state detecting apparatus 10 comprises a communication unit (wireless transmitter) and a controller. While the communication unit and the controller are illustrated as a part of the cycle computer CC, the communication unit and the controller can be provided separately from the cycle computer CC. Also alternatively, the communication unit can be connected to the cycle computer CC by one or more communication cords. Since cycle computers are well known in the bicycle field, the cycle computer CC will not be discussed in detail herein.

Figure 3:
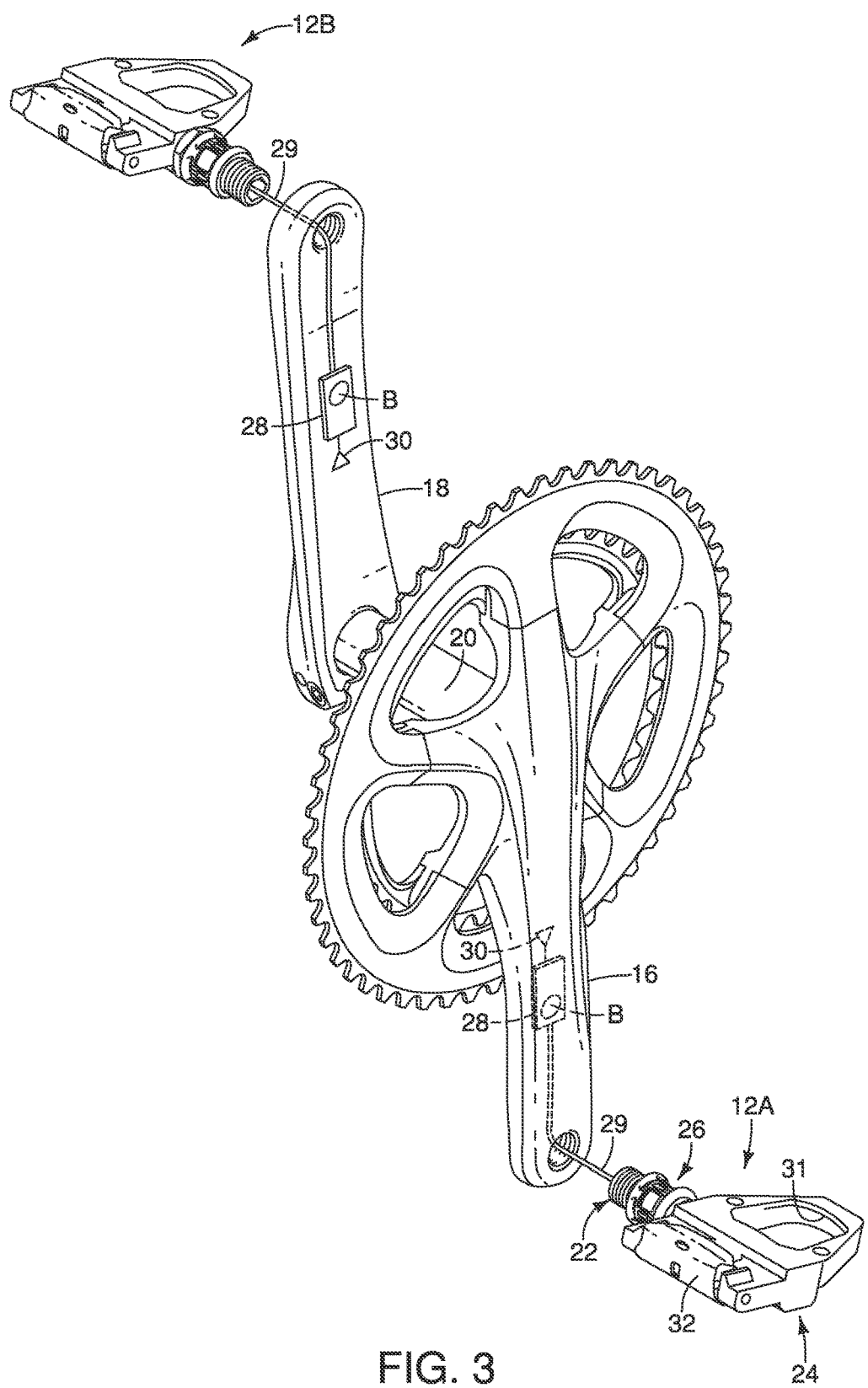
FIG. 3 is an enlarged perspective view of a bicycle crank assembly having the bicycle pedals illustrated FIG. 1.
Figure 4:
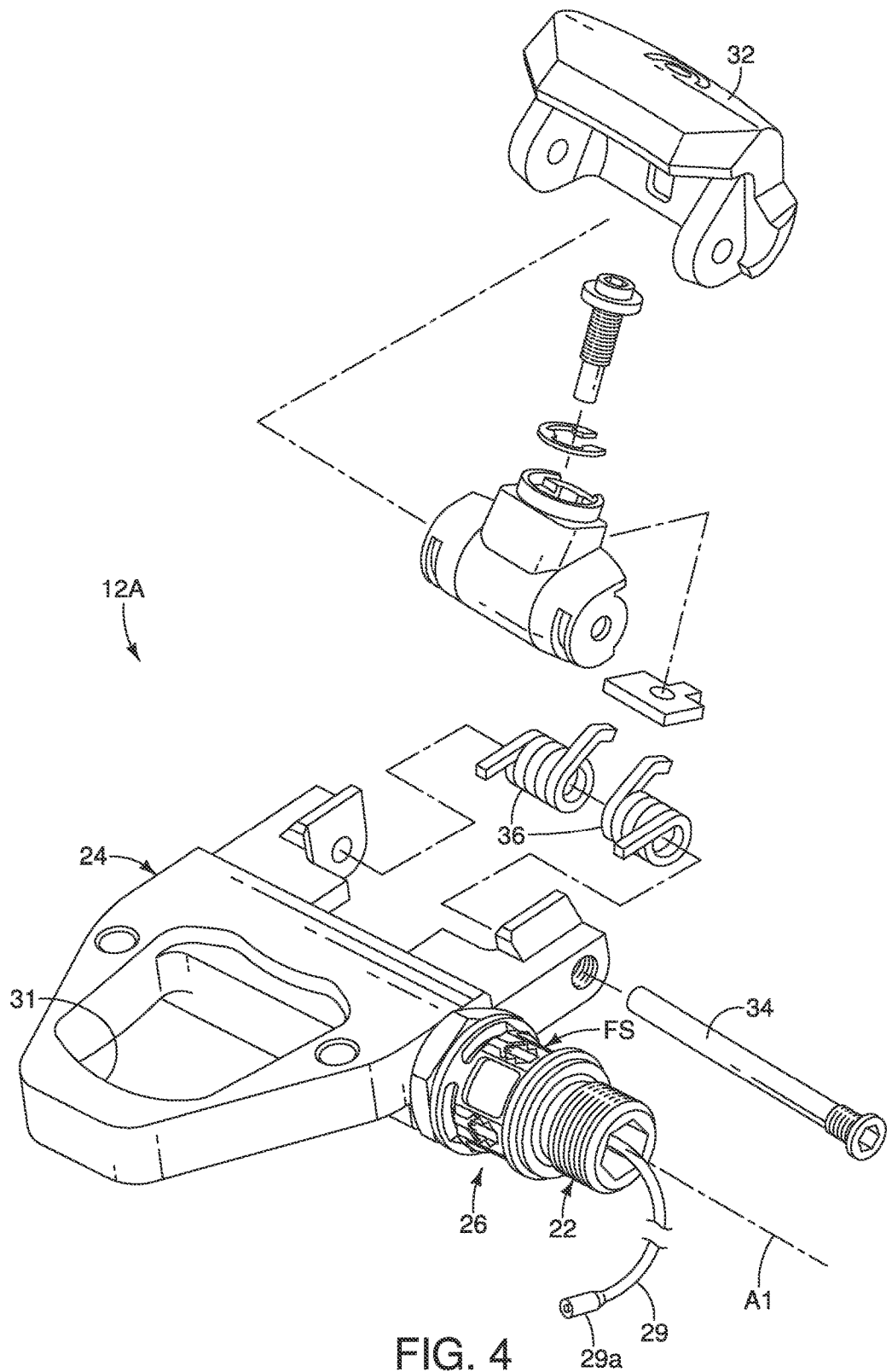
FIG. 4 is an exploded perspective view of one of the bicycle pedals (i.e., the right bicycle pedal) in accordance with the illustrated embodiment.

As seen in FIG. 3, the bicycle pedals 12A and 12B are fixedly coupled to bicycle crank arms 16 and 18 of the bicycle 1, respectively. The crank arms 16 and 18 are fixed to a crankshaft 20 such that the crank arms 16 and 18 rotate together as a unit. Basically, the (right-side) bicycle pedal 12A is a mirror image of the (left-side) bicycle pedal 12B, except that the bicycle pedal 12B uses a left-hand thread connection, while the bicycle pedal 12A uses a right-hand thread connection to help prevent the pedals from becoming loose. For the sake of simplicity, only the bicycle pedal 12A, which is a right-side bicycle pedal, will be illustrated and described herein. Of course, the description of the bicycle pedal 12A applies to the bicycle pedal 12B.

Referring to FIG. 3, the bicycle pedal 12A basically comprises a pedal spindle 22, a pedal body 24, a sensor adaptor 26 and at least one force sensor FS (discussed below). The pedal body 24 is rotatably mounted on the pedal spindle 22 about a center spindle axis A1. Preferably, the bicycle pedal 12A further comprises a controller 28 configured to be detachably fixed to the crank arm 16. Preferably, the controller 28 is mounted on the bicycle facing side of the crank arm 16.

Figure 8:
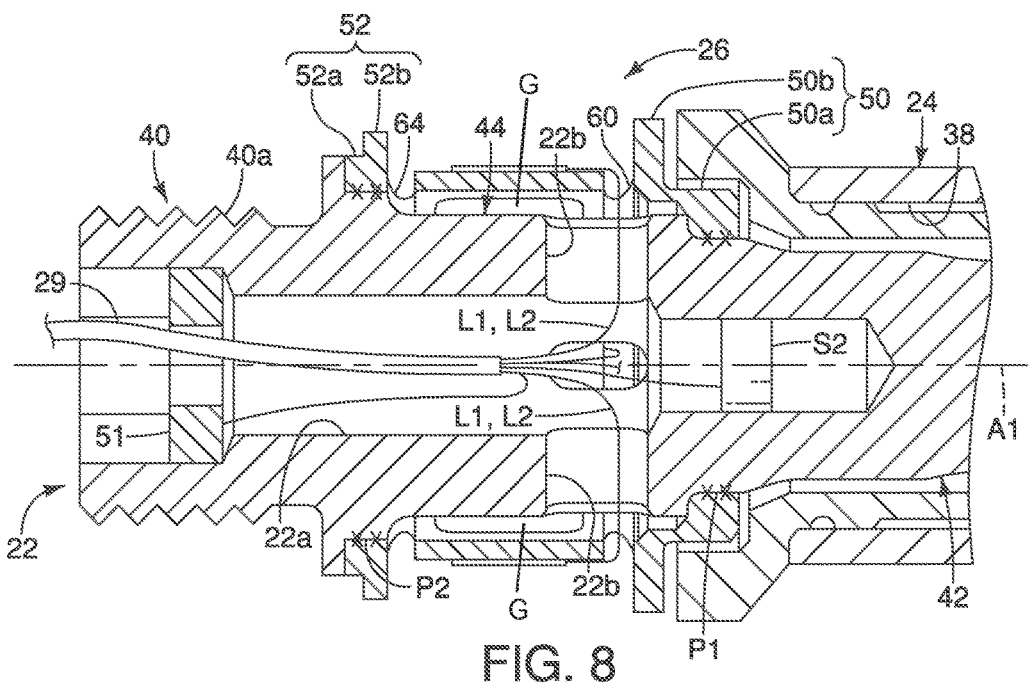
FIG. 8 is a cross sectional view of the pedal spindle and the sensor adaptor as seen along center section line 8-8 of FIG. 7.
Figure 9:
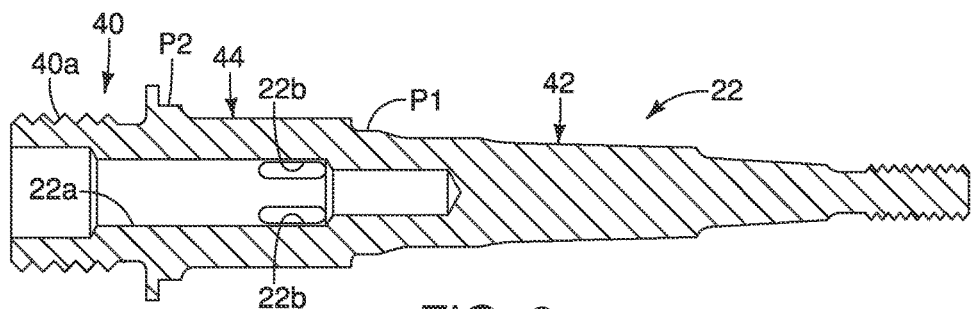
FIG. 9 is a cross sectional view of the pedal spindle as seen along center section line that is perpendicular to section line 8-8 of FIG. 7.
Figure 10:
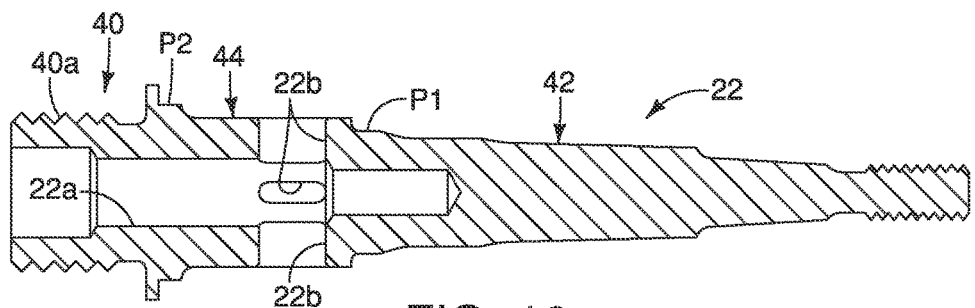
FIG. 10 is a cross sectional view of the pedal spindle as seen along center section line 8-8 of FIG. 7, but with the sensor adaptor removed.

The controller 28 is programmed to calculate a pedaling power during a pedal cycle based on data received from the at least one force sensor FS as discussed below. Preferably, the controller 28 wirelessly communicates with the cycle computer CC for notifying a rider of the pedaling power being applied to the bicycle pedal 12A. As seen in FIG. 8, the controller 28 is electrically connected to the at least one force sensor FS by a communication cord 29. Preferably, the communication cord 29 has a plug-in connector 29a at one end for detachably connecting the at least one force sensor FS to the controller 28. Preferably, the other end of the communication cord 29 is non-detachably connected to the at least one force sensor FS. Of course, it will be apparent from this disclosure that the other end of the communication cord 29 could be detachably connected to the at least one force sensor FS as needed and/or desired. The communication cord 29 can be an electric wire or flexible print board.

Preferably, as seen in FIG. 2, the bicycle pedal 12A further comprises a cadence sensor S1 in communication with the controller 28. Also preferably, the bicycle pedal 12A further comprises an inclination sensor S2 that is in communication with the controller 28. The cadence sensor S1 and the inclination sensor S2 are conventional sensors, and thus, they will only be briefly discussed herein.

The cadence sensor S1 is a device that detects the revolutions per minute (RPM) of the bicycle pedal 12A about the center crank axis of the crankshaft 20. The cadence sensor S1 can, for example, include a magnetic field detecting device (e.g., a reed switch) that detects a magnetic field of a magnet (not shown) that is attached to the bicycle frame. In the illustrated embodiment, the cadence sensor S1 is fixedly attached to the pedal spindle 22. The cadence sensor S1 can be disposed on a housing of the controller 28 or on a portion of one of the crank arms 16 and 18.

The inclination sensor S2 can be, for example, a biaxial accelerometer that measures an acceleration of the bicycle pedal 12A both horizontally and vertically. In other words, the inclination sensor S2 detects acceleration along two axes (x and y), which are disposed substantially perpendicular to one another. One of the axes of the accelerometer is oriented substantially horizontally, on the x axis, i.e., parallel to the forward direction of travel of bicycle 1. The other axis of the accelerometer is oriented substantially vertically, the y axis. The accelerometer measures the tilt of the pedal spindle 22 of the bicycle pedal 12A with respect to a base axis (e.g., the horizontal axis or the vertical axis). The measurements of the inclination sensor S2 are combined to produce the input signal representative thereof. In the illustrated embodiment, the inclination sensor S2 is fixedly attached to the pedal spindle 22.

Preferably, the bicycle pedal 12A further comprises a wireless transmitter 30 electrically connected to the at least one force sensor FS via the controller 28. Here, the wireless transmitter 30 is integrated with the controller 28 as a unit that is detachable from the crank arm 16. The controller 28 communicates the signals from the at least one force sensor FS to the cycle computer CC via the wireless transmitter 30. Moreover, in addition to the shear force data and the bending force data from the at least one force sensor FS, as discussed below, the wireless transmitter 30 can be configured to transmit wireless data to the cycle computer CC, including RPM data from the cadence sensor S1 and acceleration data from the inclination sensor S2.

The controller 28 can be programmed (pre-stored programs) to calculate the pedaling force or power applied to the bicycle pedal 12A in a well-known manner based on the bicycle pedal data (signals) received from the wireless transmitter 30. Then, based on the bicycle pedal data received, the cycle computer CC notifies a rider of the pedaling state of the bicycle pedal 12A.

In the first embodiment, the cycle computer CC is configured and arranged to receive wireless data from the wireless transmitter 30. The wireless connection may be performed using any of a radio frequency (RF), infrared, Bluetooth, ANT or any combination thereof. The actual position of the bicycle pedal 12A relative to the rotational axis is determined by signals from the inclination sensor S2 in conjunction with the cadence sensor S1. The controller 28 utilizes signals from the cadence sensor S1 to determine the actual rotational speed of the bicycle pedal 12A and can therefore correlate the detected average strain to the bicycle pedal 12A on bicycle 1. The controller 28 is programmed and/or configured to take into account the shear and bending force variations from each of the shear and bending force sensors using compensating constants.

For example, the controller 28 is provided with software that is programmed to calculate the total pedaling force or total power using the following Formula (1) having pre-stored compensating constants:

$$\begin{pmatrix} F_{ax} \\ F_{ay} \\ M_{ax} \\ M_{ay} \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \cdot \begin{pmatrix} \varepsilon_1 \\ \varepsilon_2 \\ \varepsilon_3 \\ \varepsilon_4 \end{pmatrix} \quad (1)$$

The term $F_{ax}$ is the calculated shear force exerted on the bicycle pedal 12A in a first axis. Preferably, the first axis extends in a tangential direction of a pedal circle that is traced by the center spindle axis A1 as the bicycle pedal 12A and the crank arm 16 rotate about the crank axis. The term $F_{ay}$ is the calculated shear force exerted on the bicycle pedal 12A in a second axis which is perpendicular to the first axis. The term $M_{ax}$ is the calculated bending moment of the bicycle pedal 12A in the first axis. Preferably the second axis extends in a radial direction with respect to the crankshaft 20. The term $M_{ay}$ is the calculated bending moment of the bicycle pedal 12A in the second axis. The compensation constants $a_{11}$ to $a_{44}$ are predetermined by a cyclist's calibration testing procedure. The term $\varepsilon$ refers to data received from the force sensors. The term $\varepsilon 1$ refers to data received from one or more shear force sensors as discussed below. The term $\varepsilon 2$ refers to data received from one or more shear force sensors as discussed below. The term $\varepsilon 3$ refers to data received from one or more bending force sensors as discussed below. The term $\varepsilon 4$ refers to data received from one or more bending force sensors as discussed below. The above formula includes data $\varepsilon 1$ and $\varepsilon 2$ for calculating compensation constants from at least two shear force sensors, and data $\varepsilon 3$ and $\varepsilon 4$ for at least two bending force sensors.

The values of the terms $F_{ax}$ and $F_{ay}$ are used to determine tangential and radial pedaling forces exerted on the bicycle pedal 12A in the tangential direction with respect to the pedal circle of the center spindle axis A1 and in the radial direction with respect to the crankshaft 20. If the first axis is along the tangential direction of pedal circle of the center spindle axis A1, and the second axis is along a radial direction of crankshaft 20, the inclination sensor S2 does not need to calculate the pedaling forces. Because the terms $F_{ax}$ and $F_{ay}$ are tangential pedaling force and radial pedaling force respectively. However if the first axis does not extend along the tangential direction of pedal circle of the center spindle axis A1, and the second axis extends in the radial direction of crankshaft 20, the controller calculates the tangential pedaling force and the radial pedaling force based on the values of the terms $F_{ax}$ and $F_{ay}$ and the results from the inclination sensor S2. The relationships between the first axis, the second axis and a base axis of the inclination sensor S2 are predetermined. During set-up, the controller 28 learns the tilt angle between the first axis and the second axis from at least the radial direction and the tangential direction. Then the controller 28 calculates the tangential and radial pedaling forces based on the values of the terms $F_{ax}$ and $F_{ay}$ and the tilt angle. The total power or total pedaling force that is exerted on the bicycle pedal 12A is calculated based on the data received from the cadence sensor S1, the tangential pedaling force and the predetermined distance between the center spindle axis A1 and the crank axis. When calculating total pedaling force, the controller 28 automatically takes into account the bending moment of the bicycle pedal 12A in the first and second axes. By doing so, the controller 28 compensates for any variations in the bending force exerted on the bicycle pedal 12A that results from a cyclist's shoe pushing on different points of the bicycle pedal during a pedaling cycle. As a result, the controller 28 can calculate a more accurate total pedaling force or total power. Data on the total power exerted on the bicycle pedal 12A is then displayed for the cyclist on the display of the cycle computer CC. Preferably, the cycle computer CC can display the pedaling direction and the pedaling force at the predetermined angles. The cycle computer CC can preferably display a center of the pedaling force exerted by the cyclist on the bicycle pedals 12A and 12B in the axle direction based on the values of the terms $M_{ax}$ and term $M_{ay}$.

As understood in the art, the controller 28 is a microcomputer that includes a central processing unit (CPU) or processor and other conventional components such as an input interface circuit, an output interface circuit, and storage devices such as ROM (Read Only Memory) device and RAM (Random Access Memory) device. The controller 28 is programmed to calculate a pedaling power during a pedal cycle based on data received from the at least one force sensor FS. The controller 28 can also be provided with various other control programs that perform various bicycle control operations as needed and/or desired. It will be apparent to those skilled in the bicycle field from this disclosure that the precise structure and algorithms for the controller 28 can be any combination of hardware and software that will carry out the notification functions as discussed herein.

The electrical components of the bicycle pedal 12A can be powered by a battery B (e.g., a dry cell battery and/or rechargeable dry cell battery) that is mounted on the crank arm 16. Here, the battery B is integrated with the controller 28. Alternatively, the power from the dry cells or batteries can be transferred to the electrical components of the bicycle pedal 12A by induction or slip rings or other suitable means. In accordance with some embodiments, power may also be provided by solar cells affixed to the bicycle pedal 12A or the crank 16. According to some embodiments, power for bicycle pedal 12A can be generated from piezoelectric devices which may be independent of, or part of, the force measuring sensors. Moreover, power may be provided by any combination of batteries, solar cells, piezoelectric devices, and induction.

As seen in FIG. 3, the pedal body 24 is a relatively conventional member. The pedal body 24 is rotatably mounted on the pedal spindle 22 about a center spindle axis A1. The pedal body 24 has a front cleat engagement part 31 that is integrally formed with the pedal body 24. A rear cleat engagement part 32 is pivotally mounted to the pedal body 24 by a pivot pin 34. The rear cleat engagement part 32 is biased to a cleat engagement position by a pair of torsion springs 36. The front and rear cleat engagement parts 31 and 32 releasably engage a cleat (not shown) in a conventional manner. Of course, it will be apparent from this disclosure that other pedal bodies could be used including but not limited to non-cleat type pedal bodies. Thus, the conventional aspects of the pedal body 24 will not be discussed herein.

Referring mainly to FIGS. 5 to 10, the pedal spindle 22 is preferably a multi-step spindle having numerous stepped parts. As seen in FIG. 8, the pedal spindle 22 is received in a stepped bore 38 (only partially shown) of the pedal body 24. Typically, the pedal spindle 22 is secured to the pedal body 24 in a conventional manner. Since these parts are relatively conventional parts and the specific constructions of these parts are not critical to the present embodiment, they will not be discussed or illustrated in detail herein. Rather, only those parts of the bicycle pedal 12A necessary to understand the present embodiment will be discussed.

Figure 5:
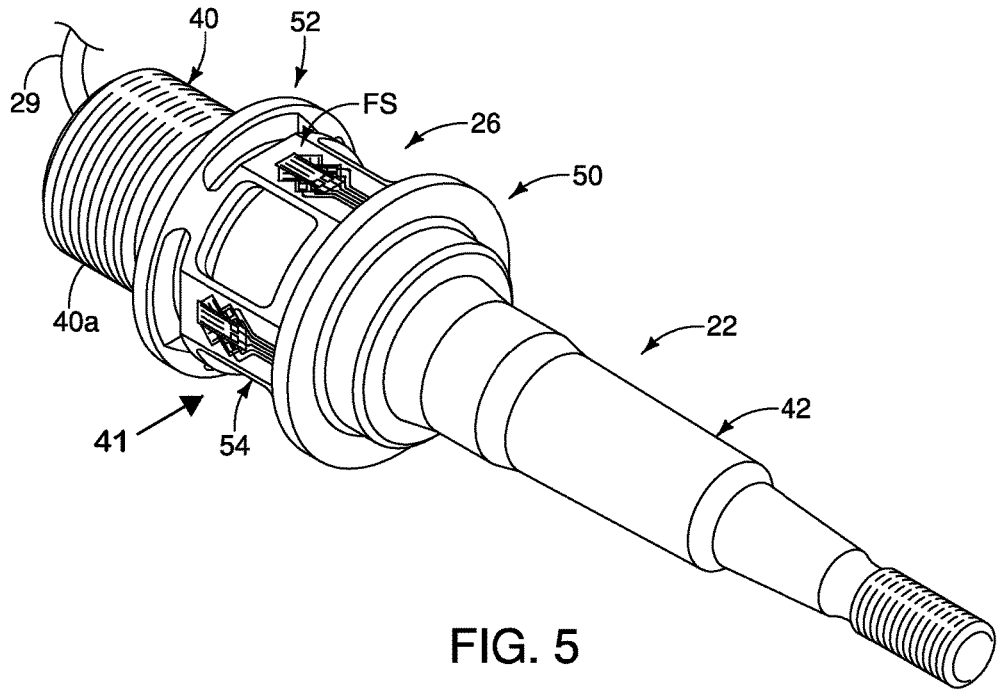
FIG. 5 is a perspective view of the pedal spindle of the bicycle pedal illustrated FIG. 4 having a sensor adaptor fixedly coupled thereto.
Figure 6:
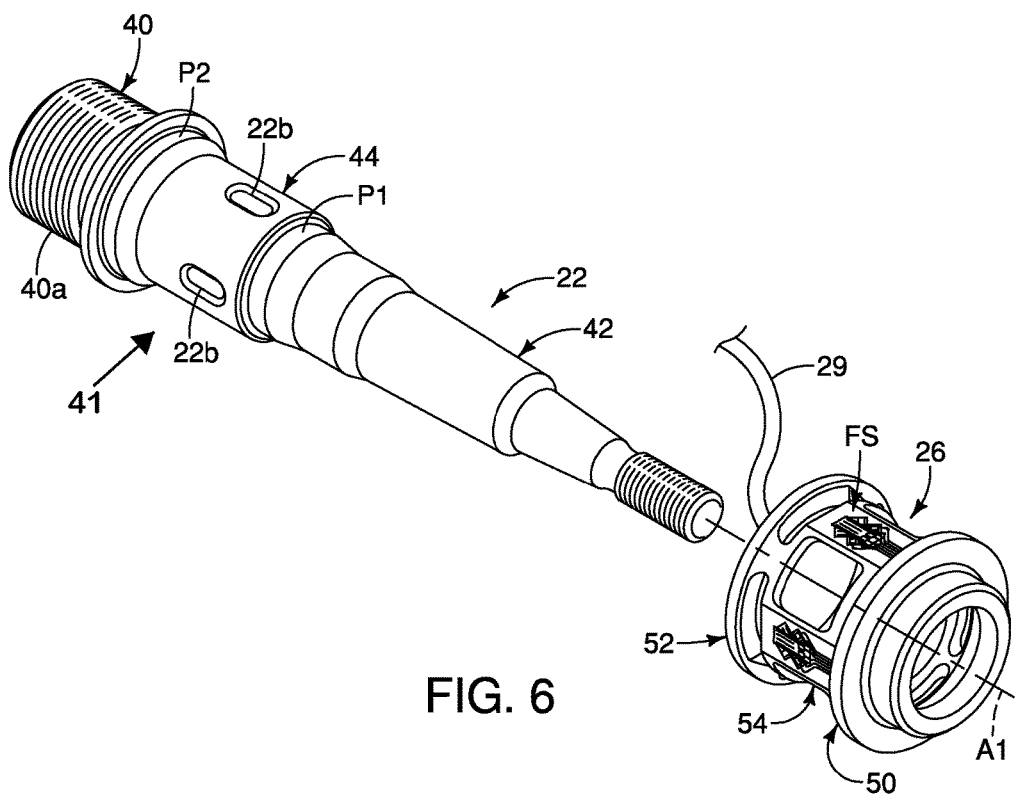
FIG. 6 is a perspective view of the pedal spindle of the bicycle pedal illustrated FIG. 4 with the sensor adaptor exploded from the pedal spindle.
Figure 7:
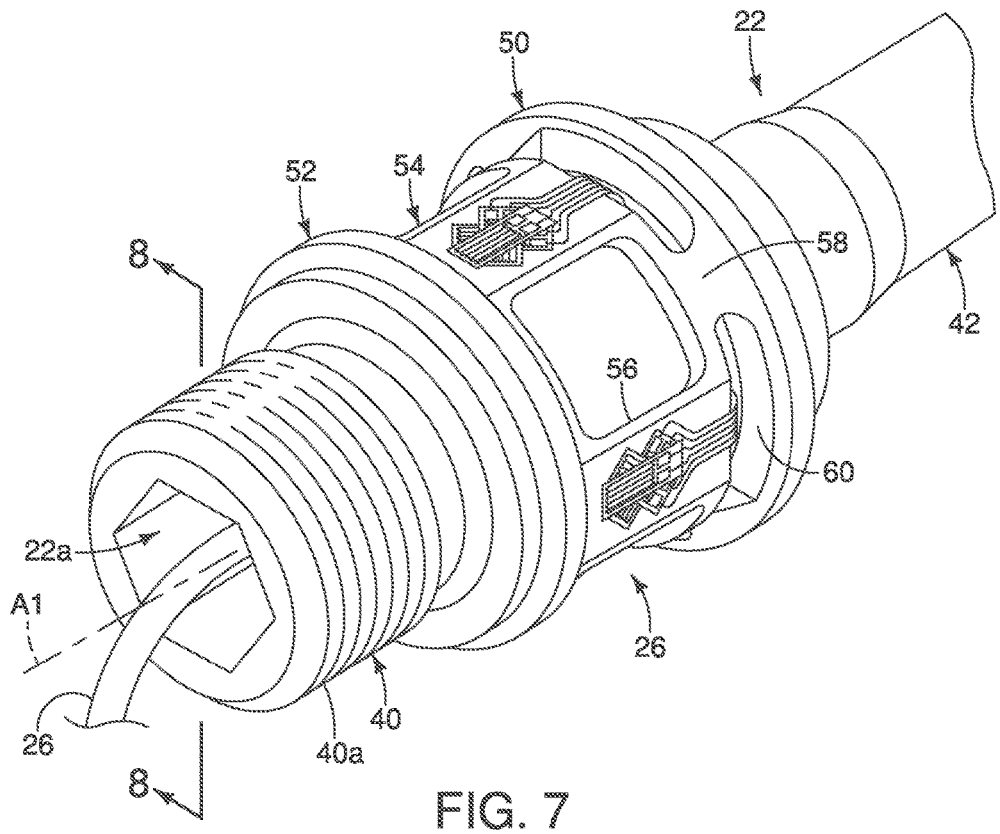
FIG. 7 is an enlarged perspective view of a portion of the pedal spindle of the bicycle pedal illustrated FIG. 4 with the sensor adaptor fixedly coupled thereto.

As seen in FIGS. 5 to 7, the pedal spindle 22 includes a crank arm mounting part 40 for mounting the bicycle pedal 12A to the crank arm 16. The pedal spindle 22 further includes an additional part 41 that extends from the crank arm mounting part 40 in an axial direction. Specifically, as seen in FIG. 3, the crank arm mounting part 40 has a thread 40a that screws into a threaded hole fixedly fastened to the crank arm 16. The pedal spindle 22 includes a pedal body support part 42. In particular, the additional part 41 of the pedal spindle 22 has the pedal body support part 42 that rotatably supports the pedal body 24. Specifically, a conventional bearing assembly (not shown) is provided between the pedal body support part 42 of the pedal spindle 22 and the pedal body 24. Thus, the pedal body 24 is freely rotatable around the center spindle axis A1. In this way, the pedal spindle 22 is fixedly coupled to the crank arm 16, while the pedal body 24 is rotatably coupled to the pedal spindle 22 on the pedal body support part 42. The pedal spindle 22 further includes a sensor support part 44 that supports the sensor adaptor 26. In particular, the additional part 41 also includes the sensor support part 44. The sensor adaptor 26 is fixed to the sensor support part 44 such that the pedaling forces applied to the pedal spindle 22 from the pedal body 24 are transmitted to the sensor adaptor 26.

The pedal spindle 22 further includes a first bore 22a that extends axially at least through the crank arm mounting part 40. The pedal spindle 22 also includes at least one second bore 22b that extends from an outer peripheral surface of the pedal spindle 22 to the first bore 22a. The first bore 22a and the at least one second bore 22b are arranged so that the communication cord 29 passes through the first bore 22a and the at least one second bore 22b so that the electrical conductors of the communication cord 29 are connected to the at least one force sensor FS.

In the illustrated embodiment, the first bore 22a extends from the end of the pedal spindle 22 completely through both the crank arm mounting part 40 and the sensor support part 44. Also in the illustrated embodiment, as seen in FIGS. 6 and 7, the at least one second bore 22b includes a plurality of the second bores 22b. In particular, the sensor support part 44 of the pedal spindle 22 is provided with four of the second bores 22b, which are circumferentially spaced apart about the outer peripheral surface of the sensor support part 44. The second bores 22b are elongated in the axial direction of the pedal spindle 22. While a particular wiring passage is provided by the first bore 22a and the second bores 22b, it will be apparent to those skilled in the bicycle field from this disclosure that the wiring passage of the pedal spindle 22 for the communication cord 29 can have other configuration as needed and/or desired. For example, the pedal spindle 22 can be configured so that the first bore does not extend into the sensor support part 44 of the pedal spindle 22 and/or so that fewer or more of the second bores 22b are provided.

Referring mainly to FIGS. 8 and 11 to 13, the sensor adaptor 26 will now be discussed in more detail. The sensor adaptor 26 is a rigid member that is made of a suitable material such as a metallic material, e.g., aluminum alloy, steel, titanium or a suitably alloy with appropriate rigidity and strength. Preferably, the sensor adaptor 26 is a one-piece, unitary member.

Basically, the sensor adaptor 26 is a tubular member that is fixed to the sensor support part 44 of the pedal spindle 22. The sensor adaptor 26 is structured or made from a material such that a strain applied to the pedal spindle 22 is decreased by the sensor adaptor 26 before reaching the at least one force sensor FS mounted thereon. In any event, the sensor adaptor 26 is supported on the sensor support part 44 of the pedal spindle 22 in a fixed location to receive a strain applied to the pedal spindle 22 by the rider via the pedal body 24.

The sensor adaptor 26 includes a first fixing part 50, a second fixing part 52 and a sensor mounting part 54. The first fixing part 50 is non-movably attached to the pedal spindle 22 at a first point P1. The second fixing part 52 is non-movably attached to the pedal spindle 22 at a second point P2. The sensor mounting part 54 extends between the first and second fixing parts 50 and 52. The sensor mounting part 54 is non-fixed to the pedal spindle 22. In other words, the sensor mounting part 54 is not directly contacting the pedal spindle 22, but rather can receive strain from the pedal spindle 22 by the differences in strain transmitted from the pedal spindle 22 at the first and second points P1 and P2. The first point P1 is axially spaced from the second point P2 with respect to the center spindle axis A1. Thus, the sensor mounting part 54 is located between the first and second fixing parts 50 and 52 with respect to the center spindle axis A1.

In the illustrated embodiment, the first fixing part 50 includes a first tubular portion 50a and a first flange 50b. Preferably, the tubular portion 50a directly contacts the sensor support part 44 at the first point P1, and is fixed to the sensor support part 44 by a press-fit connection therebetween. Alternatively, the first tubular portion 50a can be directly bonded to the sensor support part 44 at the first point P1 with a suitable bonding material such as adhesive, solder, etc. For example, as seen in FIG. 8, the first and second fixing parts 50 and 52 of the sensor adaptor 26 are bonded to the pedal spindle 22 by adhesive, which is shown as "xx" in FIG. 8.

The first flange 50b extends radially outward from the first tubular portion 50a with respect to the center spindle axis A1. The first flange 50b increases the rigidity of the first fixing part 50. Preferably, the first flange 50b extends to a free end that is spaced further from the center spindle axis A1 than the at least one force sensor FS that is disposed on the sensor mounting parts 54.

In the illustrated embodiment, the second fixing part 52 includes a second tubular portion 52a and a second flange 52b. Preferably, the second tubular portion 52a directly contacts the sensor support part 44 at the first point P1, and is fixed to the sensor support part 44 by a press-fit connection therebetween. Thus, in the first embodiment, the first and second fixing parts 50 and 52 of the sensor adaptor 26 are press-fitted on the pedal spindle 22. In this manner, the sensor adaptor 26 is fixedly attached to the pedal spindle 22 at the first and second fixing parts 50 and 52 while the sensor mounting part 54 is supported above the pedal spindle 22 so as to be non-fixed to the pedal spindle 22. Alternatively, the second tubular portion 52a can be directly bonded to the sensor support part 44 at the second point P2 with a suitable bonding material such as adhesive, solder, etc. The second flange 52b extends radially outward from the second tubular portion 52a with respect to the center spindle axis A1. The second flange 52b increases the rigidity of the second fixing part 52. Preferably, the second flange 52b extends to a free end that is spaced further from the center spindle axis A1 than the at least one force sensor FS that is disposed on the sensor mounting parts 54.

As seen in FIG. 8, in the illustrated embodiment of the sensor adaptor 26, the sensor mounting part 54 is radially spaced outwardly from the sensor support part 44 of the pedal spindle 22. In other words, the sensor mounting part 54 is concentrically disposed around the pedal spindle 22 with an annular gap G between the sensor mounting part 54 and an outer peripheral surface of the pedal spindle 22. In this way, an annular gap G exists between the sensor mounting part 54 of the sensor adaptor 26 and the sensor support part 44 of the pedal spindle 22 such that the sensor mounting part 54 does not contact the sensor support part 44 of the pedal spindle 22.

Figure 11:
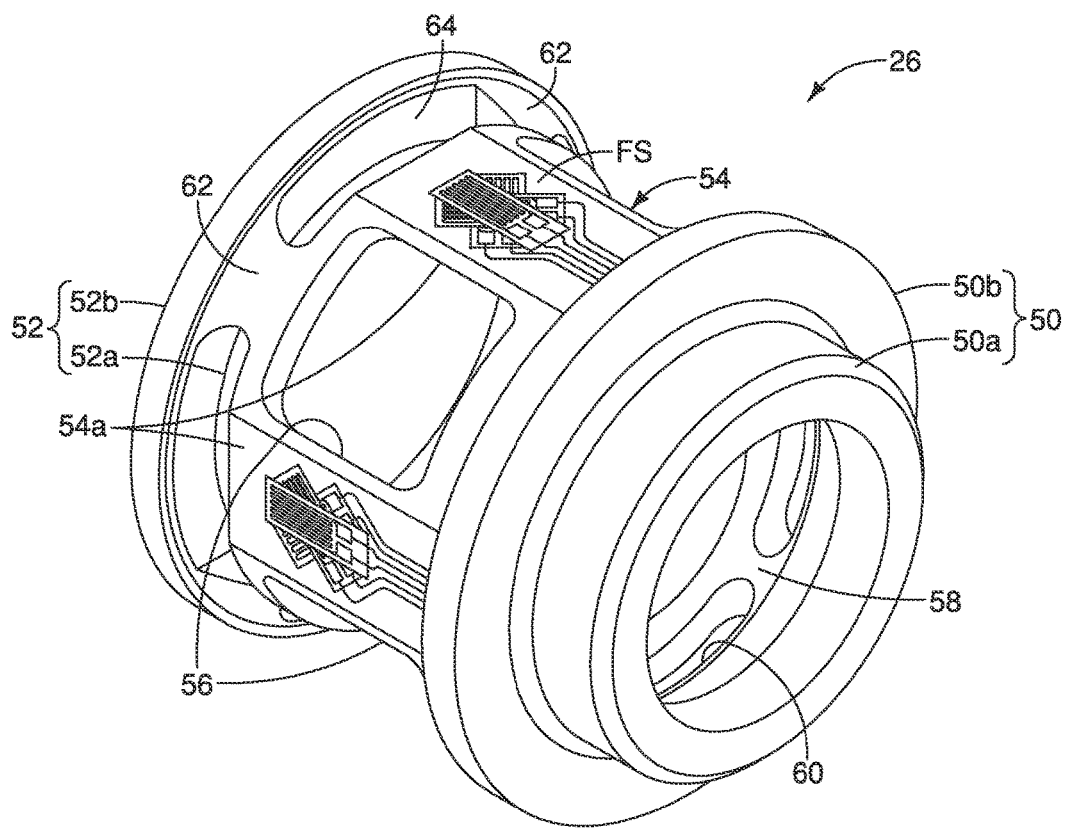
FIG. 11 is an enlarged perspective view of the sensor adaptor illustrated in FIGS. 4, 5, 7 and 8.
Figure 12:
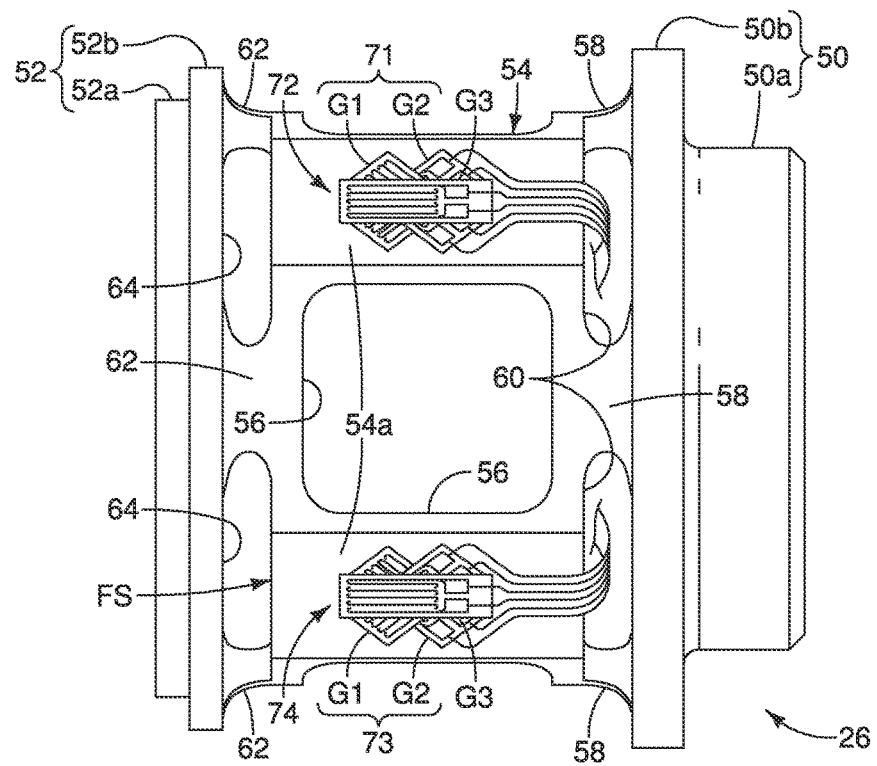
FIG. 12 is an enlarged elevational view of the sensor adaptor illustrated in FIG. 11.
Figure 13:
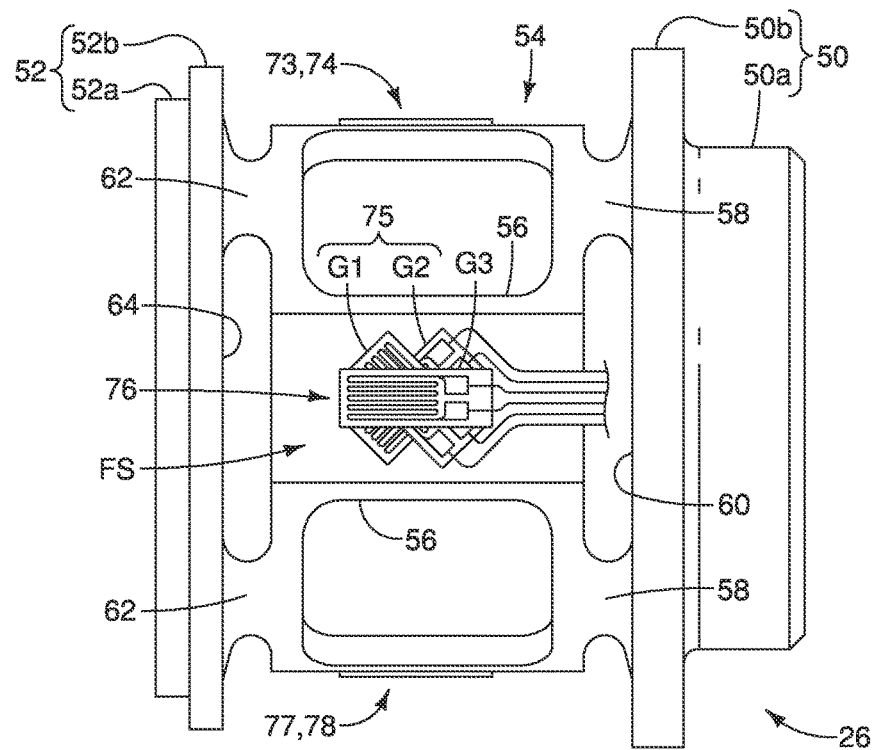
FIG. 13 is an enlarged elevational view of the sensor adaptor illustrated in FIGS. 11 and 12, with the sensor adaptor rotated forty-five degrees with respect to the view shown in FIG. 12.

As seen in FIGS. 11 to 13, the sensor mounting part 54 includes a plurality of mounting portions 54a. The mounting portions 54a are circumferentially spaced apart and separated by a plurality of openings 56. The at least one force sensor FS is disposed on the sensor mounting part 54 to detect a pedaling force transmitted from the pedal body 24 to the pedal spindle 22. Specifically, the at least one force sensor FS is disposed on at least one of the mounting portions 54a. In the illustrated embodiment, the sensor adaptor 26 includes four of the sensor mounting portions 54a separated by the openings 56. In particular, the plurality of sensor mounting portions 54a includes four mounting portions 54a that are disposed ninety degrees apart with respect to the center spindle axis A1. Each of the sensor mounting portions 54a is capable of supporting one or more force sensors. While four of the sensor mounting portions 54a are illustrated it will be apparent to those skilled in the bicycle field from this disclosure that the sensor adaptor 26 can be configured to include fewer or more sensor mounting portions as needed and/or desired depending on the configuration and/or arrangement of force sensors.

The sensor mounting part 54 is connected to the first fixing part 50 by a plurality of first connections 58 that are circumferentially spaced apart and separated by first openings 60. The sensor mounting part 54 is also connected to the second fixing part 52 by a plurality of second connections 62 that are circumferentially spaced apart and separated by second openings 64. The first and second openings 60 and 62 reduce the transfer of strain from the first and fixing parts 50 and 52, respectively. Preferably, the first openings 60 are radially aligned with the second bores 22b. Thus, the first openings 60 act as passageways for communication lines (signal conductors) of the communication cord 29 that are electrical connected to the at least one force sensor FS. Alternatively, the second openings 62 can be radially aligned with the second bores 22b so as to act as passageways for the communication lines (signal conductors) of the communication cord 29. While four of the first connections 58 and four of the second connections 62 are used to support the sensor mounting part 54, it will be apparent those skilled in the bicycle field from this disclosure that fewer or more of the first and second connections can be used as needed and/or desired.

Referring now mainly to FIGS. 11 to 15, the at least one force sensor FS of the first illustrated embodiment will now be discussed. Here, in the first illustrated embodiment, preferably, the at least one force sensor FS includes a first shear force sensor 71, a first bending force sensor 72, a second shear force sensor 73, and a second bending force sensor 74. More preferably, the at least one force sensor FS further includes a third shear force sensor 75, a third bending force sensor 76, a fourth shear force sensor 77 and a fourth bending force sensor 78. Accordingly, the at least one force sensor FS includes four shear force sensors and four bending force sensors. However, it will be apparent to those skilled in the bicycle field from this disclosure that the sensor adaptor 26 can include only one force sensor as needed or desired.

Preferably, the force sensors 71 to 78 are configured to form conventional Wheatstone bridge circuits (not shown). In this way, the shear strain on the pedal spindle 22 of the bicycle pedal 12A is measured using the first, second, third and fourth shear force sensors 71, 73, 75 and 77. On the other hand, the bending strain on the pedal spindle 22 of the bicycle pedal 12A is measured using the first, second, third and fourth bending force sensors 72, 74, 76 and 78.

Figure 15:
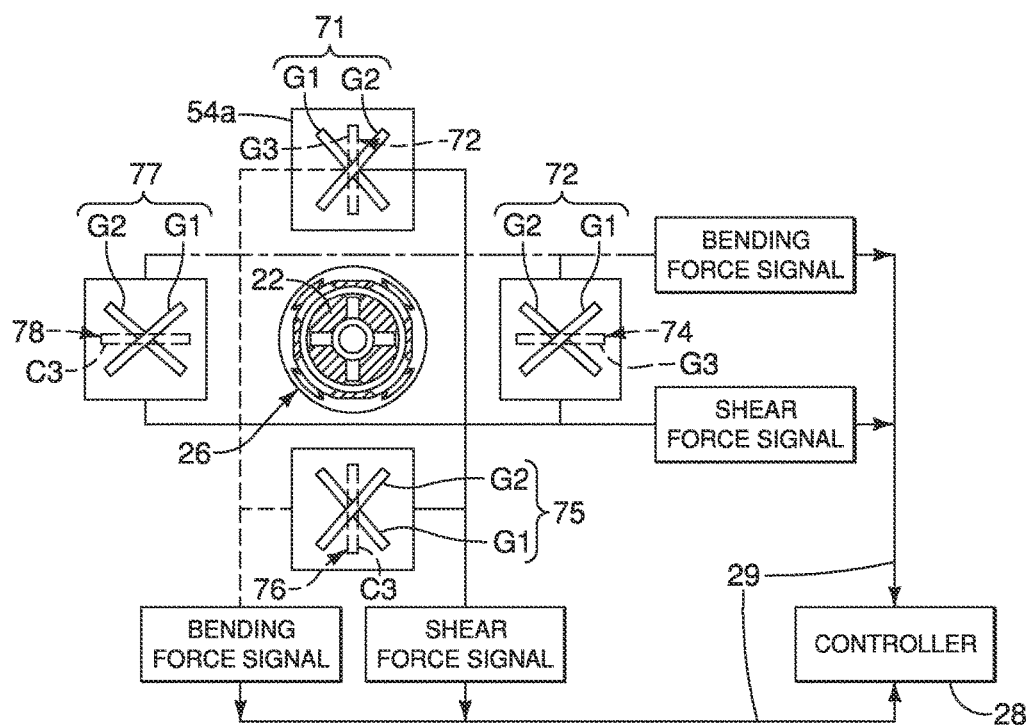
FIG. 15 is a schematic illustration of a first configuration of the force sensors mounted on the sensor adaptor in the first pattern of FIG. 14.

In particular, as diagrammatically illustrated in FIG. 15, the first and third shear force sensors 71 and 75 are configured to form a conventional Wheatstone bridge circuit (not shown) with two registration elements and to provide data for the term $\mathcal{E}1$ in Formula (1) above. The second and fourth shear force sensors 73 and 77 are also configured to form a conventional Wheatstone bridge circuit (not shown) and to provide data for the term $\mathcal{E}2$ in Formula (1) above. The first and third bending force sensors 72 and 76 are configured to form a conventional Wheatstone bridge circuit (not shown) with two other registration elements on the circuit board and to provide data for the term $\mathcal{E}3$ in Formula (1) above. The second and fourth bending force sensors 74 and 78 are configured to form a conventional Wheatstone bridge circuit (not shown) with two other registration elements on the circuit board and to provide data for the term $\mathcal{E}4$ in Formula (1) above. The resulting voltages of each of the Wheatstone bridge circuits' outputs are provided to the controller 28 as the basis for the value of shear strain and the bending strain on the bicycle pedal 12A.

The force sensors 71 to 78 are coupled to the controller 28 via the communication cord 29. Thus, the wireless transmitter 30 is electrically connected to the first, second, third and fourth shear force sensors 71, 73, 75 and 77. The controller 28 is programmed to calculate a pedaling power during a pedal cycle based on data received from the shear force sensors 71, 73, 75 and 77, and the bending force sensors 72, 74, 76 and 78. The battery B is electrically connected to the shear force sensors 71, 73, 75 and 77, and to the bending force sensors 72, 74, 76 and 78. Also the wireless transmitter 30 is electrically connected to the first, second, third and fourth bending force sensors 72, 74, 76 and 78. A signal amplifying circuit (not shown) can be electrically connected to the shear force sensors 71, 73, 75 and 77 and the bending force sensors 72, 74, 76 and 78 as needed and/or desired. Since signal amplifying circuits are known, the signal amplifying circuit will not be discussed and/or illustrated in detail herein.

In the first embodiment, the shear strain on the pedal spindle 22 of the bicycle pedal 12A is measured by the first, second, third and fourth shear force sensors 71, 73, 75 and 77. The bending strain on the pedal spindle 22 of the bicycle pedal 12A is measured by the first, second, third and fourth bending force sensors 72, 74, 76 and 78. The first shear force sensor 71 is mounted on the sensor mounting part 54 to detect a first shear component of the pedaling force with respect to the center spindle axis A1. The second shear force sensor 73 is mounted on the sensor mounting part 54 to detect a second shear component of the pedaling force with respect to the center spindle axis A1. The first and second shear force sensors 71 and 73 are disposed ninety degrees apart with respect to the center spindle axis A1. The third shear force sensor 75 is mounted on the sensor mounting part 54 to detect a third shear component of the pedaling force with respect to the center spindle axis A1. In particular, the first and third shear force sensors 71 and 75 are mounted across from each other on the sensor mounting part 54. The fourth shear force sensor 77 is mounted on the sensor mounting part 54 to detect a fourth shear component of the pedaling force with respect to the center spindle axis A1. The third and fourth shear force sensors 75 and 77 are disposed ninety degrees apart with respect to the center spindle axis A1. Thus, the second and fourth shear force sensors 73 and 77 are mounted across from each other on the sensor mounting part 54. In this way, the first shear force sensor 71 is circumferentially spaced from the second shear force sensor 73 on the sensor mounting part 54 with respect to the center spindle axis A1. Likewise, the third and fourth shear force sensors 75 and 77 are circumferentially spaced from the first and second shear force sensor 71 and 73 on the sensor mounting part 54 with respect to the center spindle axis A1. The first and third shear force sensors 71 and 75 are preferably identical to one another, except that they are mounted on parallel ones of the sensor mounting portions 54a. Similarly, the second and fourth shear force sensors 73 and 77 are preferably identical to one another, except that they are mounted on parallel ones of the sensor mounting portions 54a.

Similar to the shear force sensors 71, 73, 75 and 77, the first bending force sensor 72 is mounted on the sensor mounting part 54 to detect a first bending component of the pedaling force with respect to the center spindle axis A1. In the same way, the second bending force sensor 74 is mounted on the sensor mounting part 54 to detect a second bending component of the pedaling force with respect to the center spindle axis A1. Likewise, the third bending force sensor 76 is mounted on the sensor mounting part 54 to detect a third bending component of the pedaling force with respect to the center spindle axis A1, and the fourth bending force sensor 78 is mounted on the sensor mounting part 54 to detect a fourth bending component of the pedaling force with respect to the center spindle axis A1.

In the first embodiment, the first shear force sensor 71 and the first bending force sensor 72 are mounted on the same one of the sensor mounting portions 54a. The second shear force sensor 73 and the second bending force sensor 74 are mounted on the same one of the sensor mounting portions 54a. The third shear force sensor 75 and the third bending force sensor 76 are mounted on the same one of the sensor mounting portions 54a. The fourth shear force sensor 77 and the fourth bending force sensor 78 are mounted on the same one of the sensor mounting portions 54a. Preferably, the first, second, third and fourth bending force sensors 72, 74, 76 and 78 are arranged such that they are overlaid on top of the first, second, third and fourth shear force sensors 71, 73, 75 and 77 respectively.

In the first illustrated embodiment, the sensor support part 44 supports the sensor adaptor 26 which includes the first, second, third and fourth shear force sensors 71, 73, 75 and 77 and the first, second, third and fourth bending force sensors 72, 74, 76 and 78. Also preferably, in the first embodiment, each of the first, second, third and fourth shear force sensors 71, 73, 75 and 77 are selected from the group consisting of resistance strain gauges and semiconductor strain gauges. Likewise, preferably in the first embodiment, the first, second, third and fourth bending force sensors 72, 74, 76 and 78 are selected from the group consisting of resistance strain gauges and semiconductor strain gauges.

Preferably, each of the first, second, third and fourth shear force sensors 71, 73, 75 and 77 includes a pair of shear strain gauges G1 and G2 that each are either resistance strain gauges or semiconductor strain gauges. The first, second, third and fourth shear force sensors 71, 73, 75 and 77 are fixed to the sensor mounting parts 54 using a conventional adhesive appropriate for strain gauges. The shear strain gauges G1 and G2 are arranged non-parallel to the center spindle axis A1. The shear strain gauges G1 and G2 are also angularly offset with respect to each other. On the other hand, each of the first, second, third and fourth bending force sensors 72, 74, 76 and 78 only include a single bending strain gauge G3 that is either resistance strain gauges or semiconductor strain gauges. The first, second, third and fourth bending force sensors 72, 74, 76 and 78 are fixed to the sensor mounting parts 54 using a conventional adhesive appropriate for strain gauges. The bending strain gauges G3 are arranged parallel to the center spindle axis A1. Preferably, the bending strain gauges G3 of the first, second, third and fourth bending force sensors 72, 74, 76 and 78 are arranged such that they are overlaid on top of the corresponding one of the shear strain gauges G1 and G2 the first, second, third and fourth shear force sensors 71, 73, 75 and 77 respectively.

As previously mentioned, the sensor mounting part 54 of the sensor adaptor 26 includes four of the sensor mounting portions 54a that are circumferentially spaced ninety degrees apart with respect to the center spindle axis A1. The shear strain gauges G1 and G2 of the first shear force sensor 71 and the bending strain gauge G3 of the first bending force sensor 72 are mounted on a first of the sensor mounting portions 54a. The shear strain gauges G1 and G2 of the second shear force sensor 73 and the bending strain gauge G3 of the second bending force sensor 74 are mounted on a second of the sensor mounting portions 54a that is circumferentially spaced ninety degrees from the first of the sensor mounting portions 54a. The shear strain gauges G1 and G2 of the third shear force sensor 75 and the bending strain gauge G3 of the third bending force sensor 76 are mounted on a third of the sensor mounting portions 54a that is circumferentially spaced ninety degrees from the second of the sensor mounting portions 54a. The shear strain gauges G1 and G2 of the fourth shear force sensor 77 and the bending strain gauge G3 of the fourth bending force sensor 78 are mounted on a fourth of the sensor mounting portions 54a that is circumferentially spaced ninety degrees from the third of the mounting portions 54a.

Figure 14:
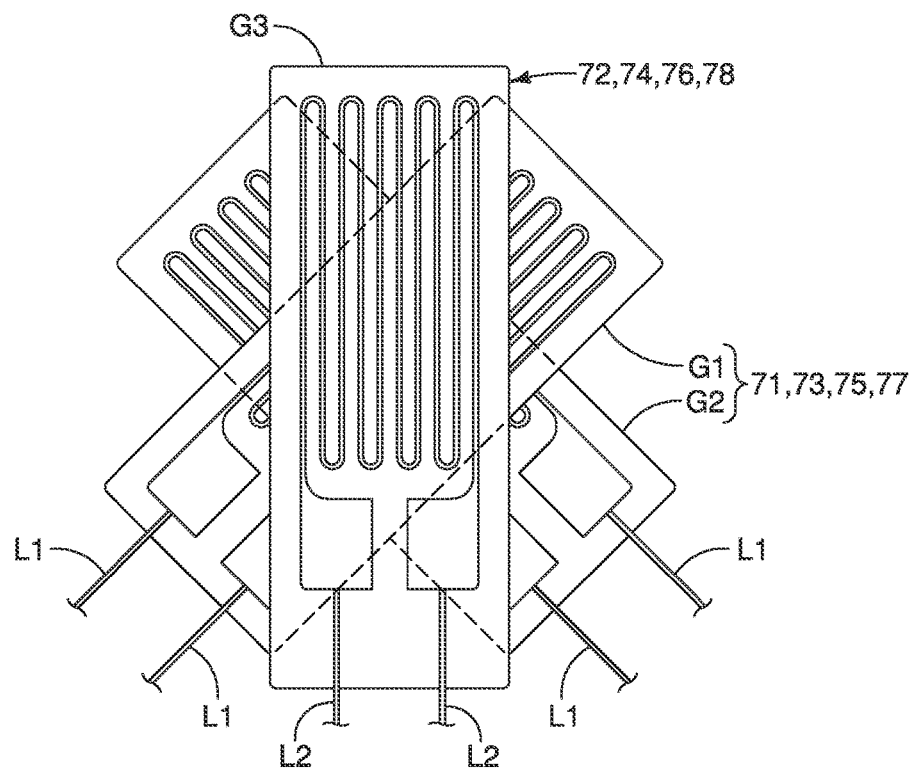
FIG. 14 is an enlarged top plan view of one set of force sensors that are installed in a first pattern on a sensor mounting part of the sensor adaptor illustrated in FIGS. 11 to 13.

As seen in FIG. 14, the strain gauges G1 and G2 of each of the first, second, third, fourth shear force sensors 71, 73, 75 and 77 has a communication line (i.e., a pair of wires L1). Also the strain gauges G3 of each of the first, second, third, fourth bending force sensors 72, 74, 76 and 78 has a communication line (i.e., a pair of wires L2). As seen in FIG. 8, the wires L1 and L2 of the communication lines extend through the at least one second bore 22b and the first bore 22a. These the wires L1 and L2 of the communication lines are signal conductors of the communication cord 29 for carrying electrical signals from the force sensors 71 to 78 to the controller 28. Once the force sensors 71 to 78 have been installed on the sensor mounting part 54 of the sensor adaptor 26 with the communication lines of the communication cord 29 extending through the bores 22a and 22b, then the first bore 22a and/or the second bores 22b can be filled in with a resin material or other similar adhesive material that retains the communication lines in position within the second bores 22b.

Figure 16:
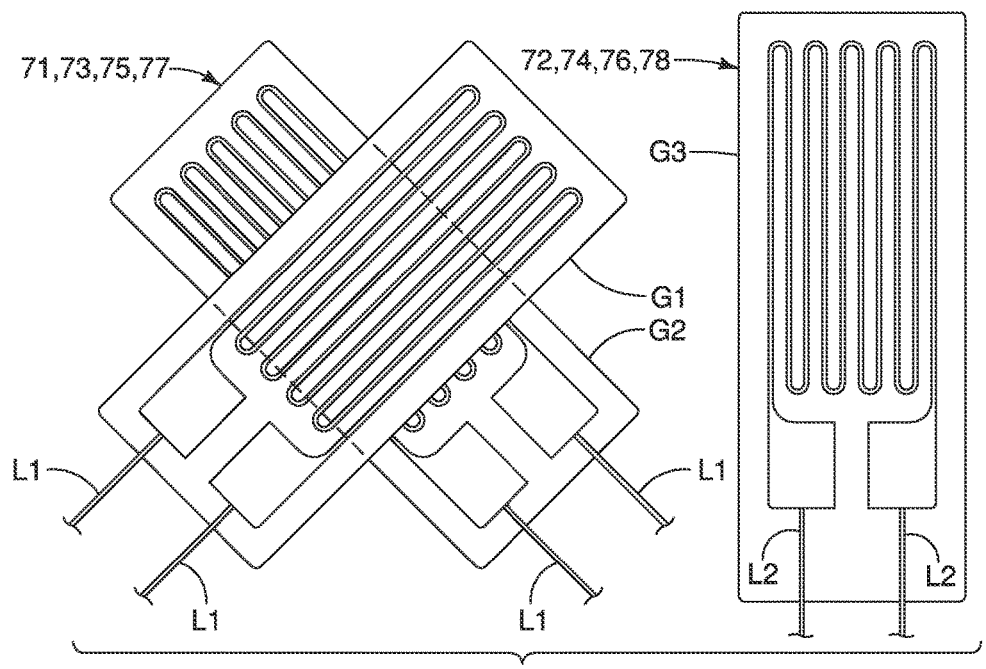
FIG. 16 is an enlarged top plan view of one set of force sensors that are installed in a second pattern on a sensor mounting part of the sensor adaptor illustrated in FIGS. 11 to 13.
Figure 17:
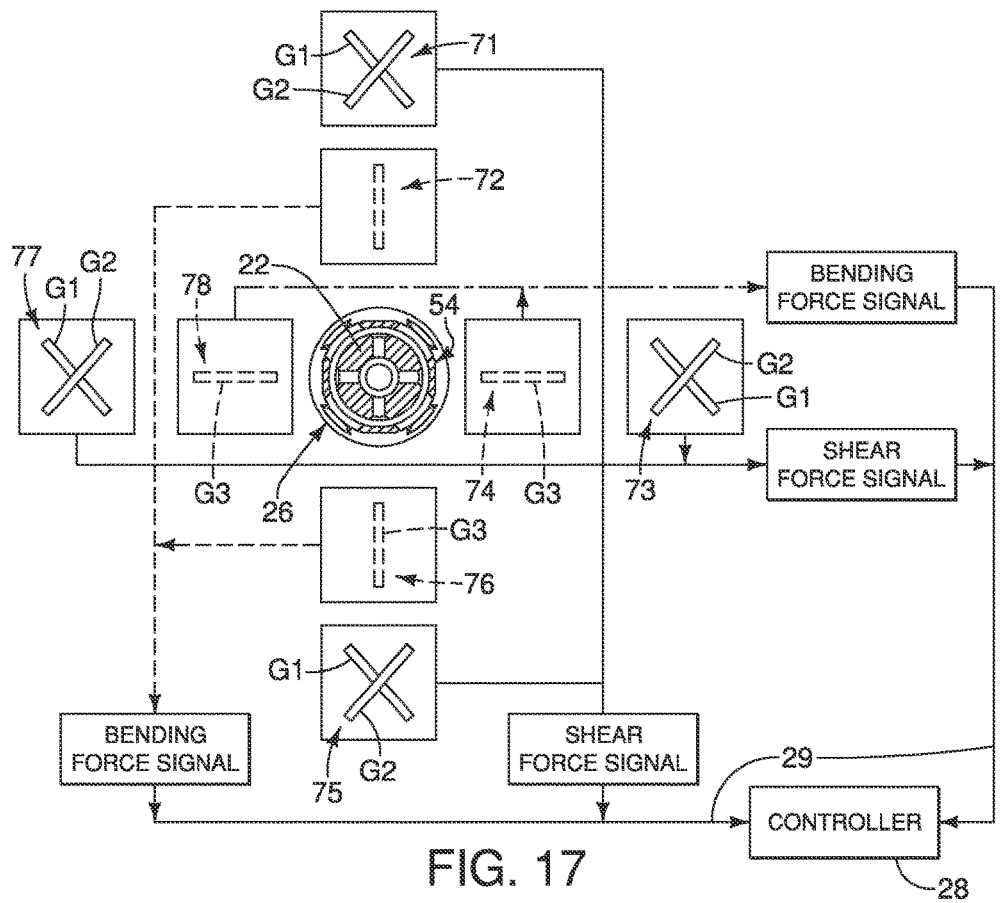
FIG. 17 is a schematic illustration of a second configuration of the force sensors mounted on the sensor adaptor in the second pattern of FIG. 16.

Referring now to FIGS. 16 and 17, a second configuration is schematically illustrated showing eight force sensors being mounted on the sensor mounting part 54 of the sensor adaptor 26 in a second pattern. Here, as shown in FIG. 16, the shear force sensors 71, 73, 75 and 77 each have a pair of the shear strain gauges G1 and G2 that are also angularly offset with respect to each other, while the bending force sensors 72, 74, 76 and 78 each have a single bending strain gauge G3. However, here, the bending strain gauge G3 does not overlie the shear strain gauges G1 and G2. Thus, here, as shown in FIG. 17, the shear force sensors 71, 73, 75 and 77 do not overlap with the bending force sensors 72, 74, 76 and 78. Otherwise, the force sensors 71 to 78 are arranged in the same manner as discussed above with respect to FIG. 15.

As diagrammatically illustrated in FIG. 16, the first and third shear force sensors 71 and 75 are configured to form a conventional Wheatstone bridge circuit (not shown) with two registration elements and to provide data for the term $\mathcal{E}1$ in Formula (1) above. The second and fourth shear force sensors 73 and 77 are also configured to form a conventional Wheatstone bridge circuit (not shown) and to provide data for the term $\mathcal{E}2$ in Formula (1) above. The first and third bending force sensors 72 and 76 are configured to form a conventional Wheatstone bridge circuit (not shown) with two other registration elements on the circuit board and to provide data for the term $\mathcal{E}3$ in Formula (1) above. The second and fourth bending force sensors 74 and 78 are configured to form a conventional Wheatstone bridge circuit (not shown) with two other registration elements on the circuit board and to provide data for the term $\mathcal{E}4$ in Formula (1) above. The resulting voltages of each of the Wheatstone bridge circuits' outputs are provided to the controller 28 as the basis for the value of shear strain and the bending strain on the bicycle pedal 12A.

Figure 18:
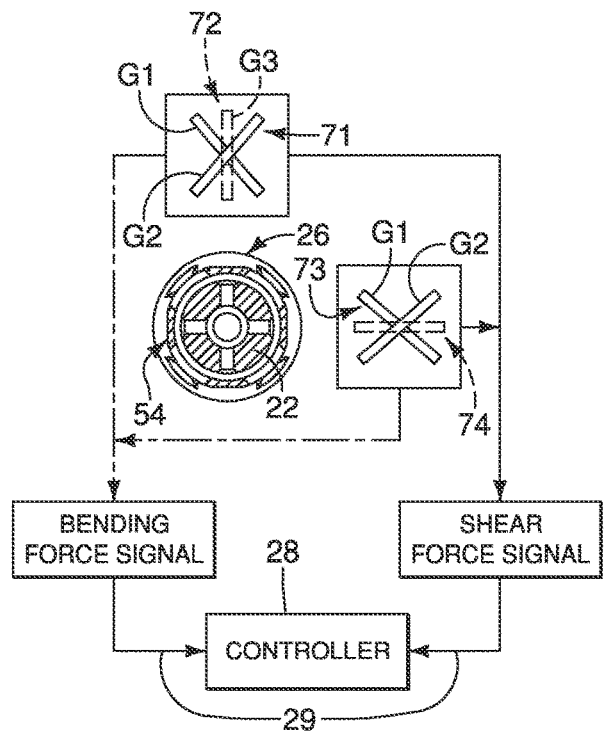
FIG. 18 is a schematic illustration of a third configuration of the force sensors mounted on the sensor adaptor in the first pattern of FIG. 14.

Referring to FIG. 18, a third configuration is schematically illustrated showing four force sensors being mounted on the sensor mounting part 54 of the sensor adaptor 26 in the first pattern. In other words, in this third configuration, the force sensors 75, 76, 77 and 78 have been omitted, but otherwise, the force sensors 71, 72, 73 and 74 are arranged as discussed in the first embodiment. Thus, here, only the force sensors 71, 72, 73 and 74 are used for detecting the strain applied to the pedal spindle 22 by the pedaling force applied to the pedal body 24 during pedaling. The force sensors 71, 72, 73 and 74 transmits the shear and bending signals to the controller 28, which then calculates the pedaling force applied to the pedal body 24 during pedaling.

The first and second shear force sensors 71 and 73 each have a pair of strain gauges G1 and G2 that are also angularly offset with respect to each other and arranged non-parallel to the center spindle axis A1 in the same manner as mentioned. The bending strain gauges G3 are arranged parallel to the center spindle axis A1 in the same manner as mentioned. In particular, the first and second shear force sensors 71 and 73 are disposed ninety degrees apart with respect to the center spindle axis A1. Also the first and second shear force sensors 71 and 73 are angularly offset from the first and second bending force sensors 72 and 74 with respect to the center spindle axis A1. The first and second bending force sensors 72 and 74 are disposed ninety degrees apart with respect to the center spindle axis A1.

Also preferably, with this third configuration, each of the first and second, shear force sensors 71 and 73 are selected from the group consisting of resistance strain gauges and semiconductor strain gauges. Likewise, preferably, with this third configuration, the first and second bending force sensors 72 and 74 are selected from the group consisting of resistance strain gauges and semiconductor strain gauges.

Figure 19:
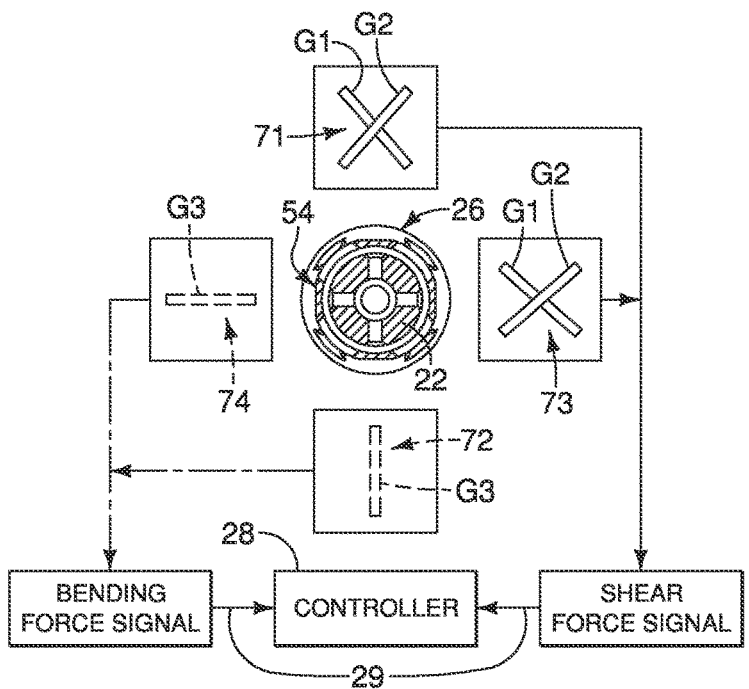
FIG. 19 is a schematic illustration of a fourth configuration of the force sensors mounted on the sensor adaptor in a third pattern.

Referring to FIG. 19, a fourth configuration is schematically illustrated showing four force sensors being mounted on the sensor mounting part 54 of the sensor adaptor 26 in a third pattern. Here, in this fourth configuration, the force sensors 75, 76, 77 and 78 have been omitted, and the first and second shear force sensors 71 and 73 are arranged at different locations from the first and second bending force sensors 72 and 74. Thus, only the force sensors 71, 72, 73 and 74 are used for detecting the strain applied to the pedal spindle 22 by the pedaling force applied to the pedal body 24 during pedaling. The force sensors 71, 72, 73 and 74 transmit the shear and bending signals to the controller 28, which then calculates the pedaling force applied to the pedal body 24 during pedaling.

The first and second shear force sensors 71 and 73 each have a pair of strain gauges G1 and G2 that are also angularly offset with respect to each other and arranged non-parallel to the center spindle axis A1 in the same manner as mentioned. The bending strain gauges G3 are arranged parallel to the center spindle axis A1 in the same manner as mentioned. In particular, the first shear force sensor 71 is disposed opposite to the first bending force sensor 72 with respect to the center spindle axis A1. Likewise, the second shear force sensor 73 is disposed opposite to the second bending force sensor 74 with respect to the center spindle axis A1. The first and second shear force sensors 71 and 73 are disposed ninety degrees apart with respect to the center spindle axis A1. Also the first and second shear force sensors 71 and 73 are angularly offset from the first and second bending force sensors 72 and 74 with respect to the center spindle axis A1. The first and second bending force sensors 72 and 74 are disposed ninety degrees apart with respect to the center spindle axis A1.

Also preferably, with this fourth configuration, each of the first and second shear force sensors 71 and 73 are selected from the group consisting of resistance strain gauges and semiconductor strain gauges. Likewise, preferably, with this fourth configuration, the first and second bending force sensors 72 and 74 are selected from the group consisting of resistance strain gauges and semiconductor strain gauges.

In all of the configurations of the force sensors, it will be apparent from this disclosure that the remaining structure of the bicycle pedal 12A is the same as discussed above with respect to FIGS. 1 to 13.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle pedal. Accordingly, these directional terms, as utilized to describe the bicycle pedal should be interpreted relative to a bicycle in an upright riding position on a horizontal surface and that is equipped with the bicycle pedal. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the bicycle field from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
   a pedal spindle including a crank arm mounting part and an additional part extending in an axial direction from the crank arm mounting part;
   a pedal body rotatably mounted on the additional part of the pedal spindle about a center spindle axis;
   a sensor adaptor including a first fixing part non-movably attached to the additional part of the pedal spindle at a first point, a second fixing part non-movably attached to the additional part of the pedal spindle at a second point, the first and second fixing parts being press-fitted on the pedal spindle such that the sensor adaptor is non-rotatable with respect to the pedal spindle, and a sensor mounting part extending between the first and second fixing parts, the first point being axially spaced from the second point with respect to the center spindle axis, the sensor mounting part being non-directly fixed to the pedal spindle; and
   at least one force sensor disposed on the sensor mounting part to detect a pedaling force transmitted from the pedal body to the pedal spindle.

2. The bicycle pedal according to claim 1, wherein the sensor mounting part includes a plurality of mounting portions that are circumferentially spaced apart and separated by openings, the at least one force sensor being disposed on at least one of the mounting portions.

3. The bicycle pedal according to claim 2, wherein the plurality of mounting portions includes four of the mounting portions that are disposed ninety degrees apart with respect to the center spindle axis.

4. The bicycle pedal according to claim 1, wherein the sensor mounting part is concentrically disposed around the pedal spindle with an annular gap between the sensor mounting part and an outer peripheral surface of the pedal spindle.

5. The bicycle pedal according to claim 1, wherein the first fixing part includes a first flange extending radially outward with respect to the center spindle axis to a first free end that is spaced further from the center spindle axis than the at least one force sensor; and
   the second fixing part includes a second flange extending radially outward with respect to the center spindle axis to a second free end that is spaced further from the center spindle axis than the at least one force sensor.

6. The bicycle pedal spindle according to claim 1, wherein the at least one force sensor is not rotatable with respect to the pedal spindle.

7. A bicycle pedal comprising:
a pedal spindle including a crank arm mounting part;
a pedal body rotatably mounted on the pedal spindle about a center spindle axis;
a sensor adaptor including a first fixing part non-movably attached to the pedal spindle at a first point, a second fixing part non-movably attached to the pedal spindle at a second point, the first and second fixing parts being press-fitted on the pedal spindle such that the sensor adaptor is non-rotatable with respect to the pedal spindle, and a sensor mounting part extending between the first and second fixing parts, the first point being axially spaced from the second point with respect to the center spindle axis, the sensor mounting part being non-directly fixed to the pedal spindle; and
at least one force sensor disposed on the sensor mounting part to detect a pedaling force transmitted from the pedal body to the pedal spindle, the at least one force sensor including
  a first shear force sensor mounted on the sensor mounting part to detect a first shear component of the pedaling force with respect to the center spindle axis;
  a second shear force sensor mounted on the sensor mounting part to detect a second shear component of the pedaling force with respect to the center spindle axis;
  a first bending force sensor mounted on the sensor mounting part to detect a first bending component of the pedaling force with respect to the center spindle axis; and
  a second bending force sensor mounted on the sensor mounting part to detect a second bending component of the pedaling force with respect to the center spindle axis.

8. The bicycle pedal according to claim 7, wherein
the first shear force sensor is circumferentially spaced from the second shear force sensor on the sensor mounting part with respect to the center spindle axis, and
the first bending force sensor is circumferentially spaced from the second bending force sensor on the sensor mounting part with respect to the center spindle axis.

9. The bicycle pedal according to claim 8, wherein
the first and second shear force sensors are selected from the group consisting of resistance strain gauges and semiconductor strain gauges, and
the first and second bending force sensors are selected from the group consisting of resistance strain gauges and semiconductor strain gauges.

10. The bicycle pedal according to claim 8, wherein
the pedal spindle further includes a pedal body support part and a sensor support part, the pedal body support part rotatably supporting the pedal body, the sensor support part supporting the sensor adaptor including the first and second shear force sensors and the first and second bending force sensors, and the sensor support part being axially disposed between the crank arm mounting part and the pedal body support part.

11. The bicycle pedal according to claim 10, wherein
the pedal spindle further includes a first bore extending axially at least through the crank arm mounting part, and at least one second bore extending from the outer peripheral surface of the pedal spindle to the first bore, and
each of the first and second shear force sensors and the first and second bending force sensors has a communication line that extends through the at least one second bore and the first bore.

12. The bicycle pedal according to claim 11, wherein
the at least one second bore includes a plurality of second bores.

13. The bicycle pedal according to claim 9, wherein
the first and second shear force sensors are disposed ninety degrees apart with respect to the center spindle axis, and
the first and second bending force sensors are disposed ninety degrees apart with respect to the center spindle axis.

14. The bicycle pedal according to claim 13, wherein
the first and second shear force sensors are angularly offset from the first and second bending force sensors with respect to the center spindle axis.

15. The bicycle pedal according to claim 14, wherein
the first shear force sensor is disposed opposite to the first bending force sensor with respect to the center spindle axis, and
the second shear force sensor is disposed opposite to the second bending force sensor with respect to the center spindle axis.

16. The bicycle pedal according to claim 13, wherein
the first shear force sensor is angularly aligned with the first bending force sensor with respect to the center spindle axis, and
the second shear force sensor is angularly aligned with the second bending force sensor with respect to the center spindle axis.

17. The bicycle pedal according to claim 7, further comprising
a controller configured to be detachably fixed to the crank arm and in communication with the first and second shear force sensors and the first and second bending force sensors.

18. The bicycle pedal according to claim 17, wherein
the controller is programmed to calculate a pedaling power during a pedal cycle based on data received from the first and second shear force sensors and the first and second bending force sensors.

19. The bicycle pedal according to claim 17, further comprising
a cadence sensor in communication with the controller.

20. The bicycle pedal according to claim 7, further comprising
a wireless transmitter electrically connected to the first and second shear force sensors and the first and second bending force sensors.

21. A bicycle pedal comprising:
a pedal spindle including a crank arm mounting part and an additional part extending in an axial direction from the crank arm mounting part;
a pedal body rotatably mounted on the additional part of the pedal spindle about a center spindle axis;
a sensor adaptor including a first fixing part non-movably attached to the additional part of the pedal spindle at a first point, a second fixing part non-movably attached to the additional part of the pedal spindle at a second point, the first and second fixing parts being bonded to the pedal spindle, and a sensor mounting part extending between the first and second fixing parts, the sensor mounting part having a first end connected to the first fixing part and a second axial end connected to the second fixing part, the first point being axially spaced from the second point with respect to the center spindle axis, the sensor mounting part being non-directly fixed to the pedal spindle and being separated from the pedal spindle by an annular gap; and at least one force sensor disposed on the sensor mounting part between the first and second axial ends of the sensor mounting part to detect a pedaling force transmitted from the pedal body to the pedal spindle.

22. A bicycle pedal comprising:

a pedal spindle including a crank arm mounting part;

a pedal body rotatably mounted on the pedal spindle about a center spindle axis;

a sensor adaptor including a first fixing part non-movably attached to the pedal spindle at a first point, a second fixing part non-movably attached to the pedal spindle at a second point, the first and second fixing parts being press-fitted on the pedal spindle such that the sensor adaptor is non-rotatable with respect to the pedal spindle, and a sensor mounting part extending between the first and second fixing parts, the first point being axially spaced from the second point with respect to the center spindle axis, the sensor mounting part being non-directly fixed to the pedal spindle, the sensor mounting part being connected to the first fixing part by a plurality of first connections that are circumferentially spaced apart and separated by openings, and being connected to the second fixing part by a plurality of second connections that are circumferentially spaced apart and separated by openings; and at least one force sensor disposed on the sensor mounting part to detect a pedaling force transmitted from the pedal body to the pedal spindle.

23. A bicycle pedal spindle comprising:

a crank arm mounting part;

and an additional part extending in an axial direction from the crank arm mounting part, the additional part having a pedal body support part configured to rotatably support a pedal body about a center spindle axis; and a sensor adaptor including a first fixing part non-movably attached to the additional part of the pedal spindle at a first point, a second fixing part non-movably attached to the additional part of the pedal spindle at a second point, the first and second fixing parts being press-fitted on the pedal spindle such that the sensor adaptor is non-rotatable with respect to the pedal spindle, and a sensor mounting part extending between the first and second fixing parts, the first point being axially spaced from the second point with respect to the center spindle axis, the sensor mounting part being non-directly fixed to the pedal spindle; and at least one force sensor disposed on the sensor mounting part to detect a pedaling force transmitted from the pedal body to the pedal spindle.

* * * * *